US012699710B2

(12) United States Patent
Ward et al.

(10) Patent No.: US 12,699,710 B2
(45) Date of Patent: Aug. 4, 2026

(54) SYSTEMS AND METHODS FOR TIERED SYNCHRONIZATION

(71) Applicant: MongoDB, Inc., New York, NY (US)

(72) Inventors: Ian Ward, Brooklyn, NY (US);
Michael Patrick O'Brien, New York, NY (US); Rushil Kumar, Forest Hills, NY (US); Sudarshan Muralidhar, Brooklyn, NY (US); Tyler Kaye, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 18/749,506

(22) Filed: Jun. 20, 2024

(65) Prior Publication Data

US 2024/0427798 A1 Dec. 26, 2024

Related U.S. Application Data

(60) Provisional application No. 63/509,442, filed on Jun. 21, 2023, provisional application No. 63/509,399, filed on Jun. 21, 2023.

(51) Int. Cl.
*G06F 16/00* (2019.01)
*G06F 16/27* (2019.01)
(52) U.S. Cl.
CPC ............ *G06F 16/275* (2019.01); *G06F 16/27* (2019.01)
(58) Field of Classification Search
CPC ............................... G06F 16/275; G06F 16/27
See application file for complete search history.

(56) References Cited

U.S. PATENT DOCUMENTS

| | | | |
|---|---|---|---|
| 6,523,032 B1 * | 2/2003 | Sunkara | ............... G06F 16/275 |
| 11,586,593 B2 * | 2/2023 | Mathurin | ........... G06F 16/1844 |
| 12,353,498 B2 * | 7/2025 | Chandrasekaran | ......................... G06F 16/9574 |

(Continued)

OTHER PUBLICATIONS

Campbell et al., "The Microsoft Data Platform", Jun. 12-14, 2007, ACM, pp. 1053-1060 (Year: 2007).*

(Continued)

*Primary Examiner* — Alexander Khong
(74) *Attorney, Agent, or Firm* — Wolf, Greenfield & Sacks, P.C.

(57) ABSTRACT

Described herein are tiered synchronization systems and methods suitable for use in non-relational database systems distributed across multiple remote locations, which may provide access to some or all functionality of a cloud-tier server at a mid-tier server. For example, the mid-tier server may be locally accessible (e.g., over LAN) to clients independent of any remote connection to the cloud-tier server (e.g., over the Internet). In some embodiments, a mid-tier server may be configured to perform flexible sync functionality, such as flexible partitioning and/or permissions, whether independently and/or in cooperation with the cloud-tier server performing the same or similar functionality. In some embodiments, systems described herein may provide flexible and consistent local data access to non-relational data in locations where remote network connections are intermittent, such as due to weather conditions, relatively frequent network outages, and/or due to the location regularly changing (e.g., onboard a cruise ship, car, or truck).

22 Claims, 24 Drawing Sheets

(56) References Cited

U.S. PATENT DOCUMENTS

| | | | |
|---|---|---|---|
| 2006/0287890 A1 * | 12/2006 | Stead | G16H 10/20 |
| | | | 705/3 |
| 2017/0177613 A1 | 6/2017 | Sharma et al. | |
| 2019/0319793 A1 | 10/2019 | Schooler et al. | |
| 2024/0007414 A1 | 1/2024 | Jain et al. | |
| 2024/0086567 A1 | 3/2024 | Garg et al. | |
| 2024/0427798 A1 | 12/2024 | Ward et al. | |

OTHER PUBLICATIONS

Li et al., "Load Balancing for Multi-tiered Database Systems through Autonomic Placement of Materialized Views", 2006, IEEE, pp. 1-12 (Year: 2006).*
Lei et al., "MCloudDB: A Mobile Cloud Database Service Framework", 2015, IEEE, pp. 6-15 (Year: 2015).*

* cited by examiner

Method 800

Begin

802  Provide Mid-Tier Data Access to Client(s)

804  Sync with Cloud-Tier

End

Method 900

Begin

902    Sync Mid-Tier Database with Client System(s)

Remote Connected? 904

No

Yes

906   Sync Mid-Tier Database with Cloud-Tier Database

End

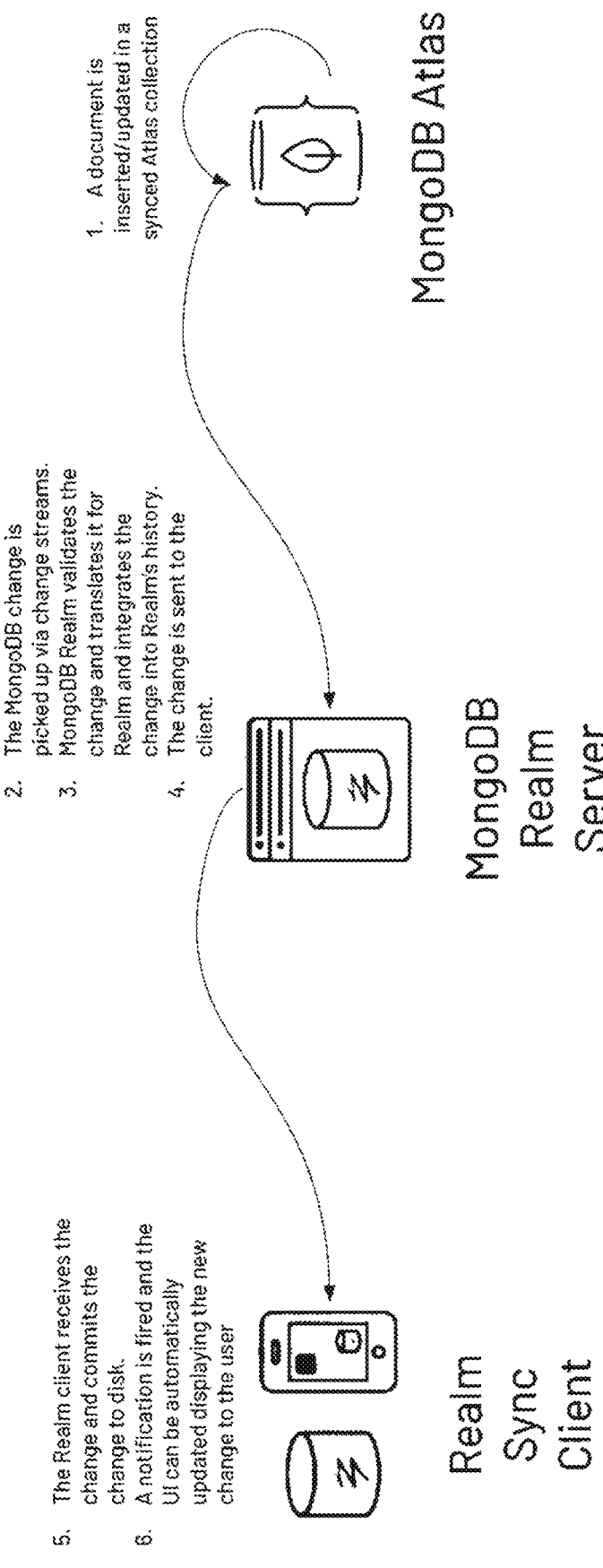

1. A document is inserted/updated in a synced Atlas collection

2. The MongoDB change is picked up via change streams.
3. MongoDB Realm validates the change and translates it for Realm and integrates the change into Realm's history.
4. The change is sent to the client.

MongoDB Realm Server

MongoDB Atlas

5. The Realm client receives the change and commits the change to disk.
6. A notification is fired and the UI can be automatically updated displaying the new change to the user Realm Sync Client

FIG. 8

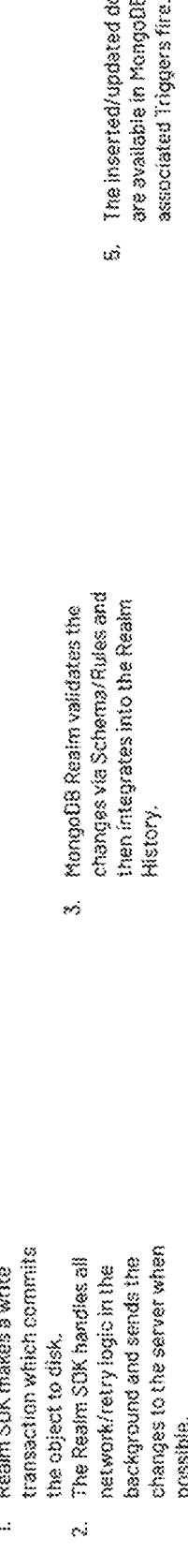

1. Realm SDK makes a write transaction which commits the object to disk.
2. The Realm SDK handles all network/retry logic in the background and sends the changes to the server when possible.

3. MongoDB Realm validates the changes via Schema/Rules and then integrates into the Realm History.

4. MongoDB Realm then converts the Realm object to a MongoDB document and inserts it into the Atlas collection.

5. The inserted/updated documents are available in MongoDB and any associated Triggers fire.

Realm Sync Client

MongoDB Realm Server

MongoDB Atlas

FIG. 9

SYSTEMS AND METHODS FOR TIERED SYNCHRONIZATION

RELATED APPLICATIONS

This application claims priority under 35 U.S.C. § 119 (e) to U.S. Provisional Application Ser. No. 63/509,399, filed Jun. 21, 2023, and entitled "SYSTEMS AND METHODS FOR SYNCHRONIZATION," the contents of which are incorporated herein by reference in their entirety. This application claims priority under 35 U.S.C. § 119 (e) to U.S. Provisional Application Ser. No. 63/509,442, filed Jun. 21, 2023, and entitled "SYSTEMS AND METHOD FOR MANAGING A DISTRIBUTED DATABASE," the contents of which are incorporated herein by reference in their entirety.

NOTICE OF MATERIAL SUBJECT TO COPYRIGHT PROTECTION

BACKGROUND

Distributed database systems may be implemented across a variety of geographic locations from which computing devices may store, access, and change data stored in a distributed database. Multiple users may change the same data object in the distributed database independently of one another, creating data conflicts. In some cases, even with perfect network connectivity, data conflicts may arise due to any latency in transmitting changes over a network. In cases with some computing devices having poor or intermittent network connectivity, data conflicts may occur more frequently.

SUMMARY

The inventors have developed mid-tier synchronization systems suitable for use in non-relational database systems distributed across multiple remote locations. In some embodiments, mid-tier synchronization systems described herein may provide access to some or all functionality of a cloud-tier server at a mid-tier server. For example, the mid-tier server may be locally accessible (e.g., over LAN) to clients independent of any remote connection to the cloud-tier server (e.g., over the Internet). In some embodiments, a mid-tier server may be configured to perform flexible sync functionality, such as flexible partitioning and/or permissions, whether independently and/or in cooperation with the cloud-tier server performing the same or similar functionality. In some embodiments, systems described herein may provide flexible and consistent local data access to non-relational data in locations where remote network connections are intermittent, such as due to weather conditions, relatively frequent network outages, and/or due to the location regularly changing (e.g., onboard a cruise ship, car, or truck).

In some embodiments, a tiered database synchronization system described herein may include a mid-tier server database that is non-relational (e.g., at least partially), a cloud-tier server database that is non-relational (e.g., at least partially) and in communication with the mid-tier server database over a remote network connection (e.g., the Internet). For example, the cloud-tier server database may be distributed over a number of locations, and the mid-tier server database may be deployed at a location (e.g., warehouse, cruise ship, etc.). In some embodiments, the system may further include a mid-tier server operatively coupled to the mid-tier server database and configured to, independent of the remote network connection, synchronize the mid-tier server database with data interactions between client systems and the mid-tier server over a local network connection. For example, even when the mid-tier server database does not have access to the cloud-tier server database, or to the remote network connection at all, the mid-tier server may still provide local sync functionality for interactions with client systems (e.g., over LAN). In some embodiments, when (e.g., only when) the mid-tier server database is connected to the cloud-tier server database over the remote network connection, the mid-tier server may be configured to synchronize the mid-tier server database with the cloud-tier server database. For example, the mid-tier server may be configured to periodically check the remote network connection for access to the cloud-tier server database and perform synchronization when the connection is confirmed.

In some embodiments, the mid-tier server may be configured to periodically check the remote network connection and, in response to detecting that the mid-tier server is connected to the cloud-tier server database over the remote network connection, synchronize the mid-tier server database with the cloud-tier server database.

In some embodiments, the mid-tier server may be configured to, independent of the remote network connection, act as a server to client systems connected to the mid-tier server over the local network connection.

In some embodiments, the tiered synchronization system may further include a cloud-tier server operatively coupled to the cloud-tier server database, wherein the mid-tier server is further configured to act as a client to the cloud-tier server when the mid-tier server is connected to the cloud-tier server over the remote network connection.

In some embodiments, the remote network connection may include the Internet and the local network connection may include a local area network connection.

In some embodiments, the mid-tier server database and the cloud-tier server database may be remote with respect to one another, and the mid-tier server may be configured to communicate over the local network connection with client systems that are local to the mid-tier server.

In some embodiments, the mid-tier server may be located in a location at which the mid-tier server has intermittent access to the cloud-tier server database over the remote network connection.

In some embodiments, the mid-tier server may be configured to, independent of the remote network connection, respond to requests for access to data stored in the mid-tier server database, the requests received from client systems over the local network connection.

In some embodiments, the mid-tier server may be further configured to, when connected to the cloud-tier server database over the remote network connection, request access to data stored in the cloud-tier server database in response to requests for access to data not stored in the mid-tier server database, the requests received from client systems over the local network connection.

In some embodiments, the mid-tier server may be configured to receive, from a first client system over the local network connection, a first changeset that is representative of an operation on a data object in the mid-tier server database performed by the first client system, receive, from a second client system over the local network connection, a second changeset that is representative of an operation on the data object performed by the second client system, and in response to receiving, from the first client system over the local network connection, a synchronization request for synchronizing the first client system at least with the second client system, transmit, to the first client system, the second changeset, and the first client system may be configured to merge the first changeset and the second changeset to update the data object.

In some embodiments, the mid-tier server may be further configured to, when the mid-tier server is connected to the cloud-tier server over the remote network connection, receive, from the cloud-tier server database over the remote network connection, a third changeset that is representative of an operation on a version of the data object in the cloud-tier server database performed by a client system that is not connected to the mid-tier server over the local network connection, and in response to receiving the synchronization request from the first client system over the local network connection, further transmit, to the first client system over the local network connection, the third changeset, and the first client system may be further configured to merge the first changeset and the second changeset with the third changeset.

In some embodiments, a tiered database synchronization method may include synchronizing, by a mid-tier server, a mid-tier server database with data interactions between client systems and the mid-tier server over a local network connection, the mid-tier server database being non-relational, and when the mid-tier server is connected to a cloud-tier server database over a remote network connection, synchronizing the mid-tier server database with the cloud-tier server database, the cloud-tier server database being non-relational, and synchronizing the mid-tier server database with the data interactions between client systems and the mid-tier server may be independent of the remote network connection.

In some embodiments, the tiered database synchronization method may further include, by the mid-tier server, periodically checking the remote network connection, synchronizing the mid-tier server database with the cloud-tier server database may be in response to detecting that the mid-tier server is connected to the cloud-tier server database over the remote network connection.

In some embodiments, the tiered database synchronization method may further include, by the mid-tier, independent of the remote network connection, acting as a server to client systems connected to the mid-tier server over the local network connection.

In some embodiments, the tiered database synchronization method may further include, by the mid-tier server, acting as a client to a cloud-tier server coupled to the cloud-tier server database when the mid-tier server is connected to the cloud-tier server over the remote network connection.

In some embodiments, the remote network connection may include the Internet and the local network connection may include a local area network connection.

In some embodiments, the mid-tier server database and the cloud-tier server database may be remote with respect to one another, and the mid-tier server may communicate over the local network connection with client systems that are local to the mid-tier server.

In some embodiments, the mid-tier server may be located in a location at which the mid-tier server has intermittent access to the cloud-tier server database over the remote network connection.

In some embodiments, the tiered database synchronization method may further include, by the mid-tier server, independent of the remote network connection, responding to requests for access to data stored in the mid-tier server database, the requests received from client systems over the local network connection.

In some embodiments, the tiered database synchronization method may further include, by the mid-tier server, when connected to the cloud-tier server database over the remote network connection, requesting access to data stored in the cloud-tier server database in response to requests for access to data not stored in the mid-tier server database, the requests received from client systems over the local network connection.

In some embodiments, the tiered database synchronization method may further include, by the mid-tier server receiving, from a first client system over the local network connection, a first changeset that is representative of an operation on a data object in the mid-tier server database performed by the first client system, receiving, from a second client system over the local network connection, a second changeset that is representative of an operation on the data object performed by the second client system, and in response to receiving, from the first client system over the local network connection, a synchronization request for synchronizing the first client system at least with the second client system, transmitting, to the first client system, the second changeset, and the first client system may merge the first changeset and the second changeset to update the data object.

In some embodiments, the tiered database synchronization method may further include, by the mid-tier server, when the mid-tier server is connected to the cloud-tier server over the remote network connection, receiving, from the cloud-tier server database over the remote network connection, a third changeset that is representative of an operation on a version of the data object in the cloud-tier server database performed by a client system that is not connected to the mid-tier server over the local network connection, and, in response to receiving the synchronization request from the first client system over the local network connection, further transmitting, to the first client system over the local network connection, the third changeset, and the first client system may further merge the first changeset and the second changeset with the third changeset.

In some embodiments, a tiered database synchronization system may include a cloud-tier server comprising a cloud-tier non-relational database and a mid-tier server comprising a mid-tier non-relational database storing mid-tier data corresponding to a subset of cloud-tier data stored in the cloud-tier non-relational database. For example, the mid-tier data may be used as a local replica of the cloud-tier data for local reference (e.g., over LAN) to the cloud-tier data, and/or the cloud-tier data may be used as a remote replica for data manipulated locally (e.g., over LAN). In some embodiments, the mid-tier server may be configured to provide access to the mid-tier data to one or more clients over a local network. For example, the mid-tier server may be connected to client systems over LAN to provide access to the data locally. In some embodiments, the mid-tier server may be further configured to synchronize data with the cloud-tier server over the Internet. For example, when data is modified locally (e.g., by a client interacting with the mid-tier server over LAN), the mid-tier server may synchronize the modified data with the cloud-tier server database over the Internet (e.g., only when an Internet connection may be established).

In some embodiments, the mid-tier server may be configured to synchronize the mid-tier data with the cloud-tier data when the mid-tier data is modified by the one or more clients, and the mid-tier server detects the modification over the local network and when the mid-tier data is modified at the cloud-tier server and the mid-tier server detects the modification over the Internet.

In some embodiments, the mid-tier server may be configured to provide, to the one or more clients, access to the mid-tier data and request, from the cloud-tier database, access to data stored in the non-relational portion of the cloud-tier database that is not stored in the non-relational portion of the mid-tier database.

In some embodiments, the mid-tier server may be further configured to, while the mid-tier server is disconnected from the cloud-tier server update the mid-tier data when modified by a first client and provide updated mid-tier data to a second client.

In some embodiments, the mid-tier server may be further configured to, when the mid-tier server is reconnected to the cloud-tier server after being disconnected from the cloud-tier server, update the subset of cloud-tier data based on the updated mid-tier data.

In some embodiments, the mid-tier server may be physically located in a location with intermittent access to the Internet.

In some embodiments, the mid-tier server may be configured to receive, from a first client over the local network, a first changeset that is representative of an operation on a data object in the non-relational portion of the mid-tier database performed by the first client, receive, from a second client over the local network, a second changeset that is representative of an operation on the data object performed by the second client, in response to receiving, from the first client over the local network, a synchronization request for synchronizing the first client at least with the second client, transmit, to the first client over the local network, the second changeset, and the first client may be configured to merge the first changeset and the second changeset to update the data object.

In some embodiments, the mid-tier server may be further configured to receive, from the cloud-tier server over the Internet, a third changeset that is representative of an operation on a version of the data object in the non-relational portion of the cloud-tier database performed by a client that is not connected over the local network and, in response to receiving the synchronization request from the first client over the local network, further transmit, to the first client over the local network, the third changeset, and the first client may be further configured to merge the first changeset and the second changeset with the third changeset.

In some embodiments, the mid-tier server may be configured to act as a client of the cloud-tier server over the Internet and act as a server for the one or more clients over the local network.

In some embodiments, the mid-tier server may be configured to periodically check an Internet connection and, in response to detecting that the mid-tier server is connected to the cloud-tier server over the Internet, synchronize data with the cloud-tier server over the Internet.

In some embodiments, a tiered database synchronization method may include providing access, by a mid-tier server to one or more clients over a local network, to mid-tier data stored in a non-relational portion of a mid-tier database, the mid-tier data corresponding to a subset of cloud-tier data stored in a non-relational portion of a cloud-tier database of a cloud-tier server, and synchronizing, by the mid-tier server, data with the cloud-tier server over the Internet.

In some embodiments, the tiered database synchronization method may further include, by the mid-tier server, synchronizing the mid-tier data with the cloud-tier data when the mid-tier data is modified by the one or more clients, and the mid-tier server detects the modification over the local network and when the mid-tier data is modified at the cloud-tier server and the mid-tier server detects the modification over the Internet.

In some embodiments, the tiered database synchronization method may further include, by the mid-tier server, providing, to the one or more clients, access to the mid-tier data and requesting, from the cloud-tier database, access to data stored in the non-relational portion of the cloud-tier database that is not stored in the non-relational portion of the mid-tier database.

In some embodiments, the tiered database synchronization method may further include, by the mid-tier server, while the mid-tier server is disconnected from the cloud-tier server, updating the mid-tier data when modified by a first client and providing updated mid-tier data to a second client.

In some embodiments, the tiered database synchronization method may further include, by the mid-tier server, when the mid-tier server is reconnected to the cloud-tier server after being disconnected from the cloud-tier server, updating the subset of cloud-tier data based on the updated mid-tier data.

In some embodiments, the mid-tier server may be physically located in a location with intermittent access to the Internet.

In some embodiments, the tiered database synchronization method may further include, by the mid-tier server, receiving, from a first client over the local network, a first changeset that is representative of an operation on a data object in the non-relational portion of the mid-tier database performed by the first client, receiving, from a second client over the local network, a second changeset that is representative of an operation on the data object performed by the second client, and, in response to receiving, from the first client over the local network, a synchronization request for synchronizing the first client at least with the second client, transmitting, to the first client over the local network, the second changeset, and the first client may merge the first changeset and the second changeset to update the data object.

In some embodiments, the tiered database synchronization method may further include, by the mid-tier server, receiving, from the cloud-tier server over the Internet, a third changeset that is representative of an operation on a version of the data object in the non-relational portion of the cloud-tier database performed by a client that is not connected over the local network and, in response to receiving the synchronization request from the first client over the local network, further transmitting, to the first client over the local network, the third changeset, and the first client may further merge the first changeset and the second changeset with the third changeset.

In some embodiments, the tiered database synchronization method may further include, by the mid-tier server, acting as a client of the cloud-tier server over the Internet and acting as a server for the one or more clients over the local network.

In some embodiments, the tiered database synchronization method may further include, by the mid-tier server, periodically checking an Internet connection, and synchronizing data with the cloud-tier server over the Internet may be in response to detecting that the mid-tier server is connected to the cloud-tier server over the Internet.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are described herein with reference to the accompanying figures, which are not intended to be drawn to scale. The figures are included to provide illustration and a further understanding of the various aspects and embodiments, and are incorporated in and constitute a part of this specification, but are not intended as a definition of the limits of aspects here. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 8 is a diagram of an example system with further exemplary processes, according to some embodiments.

FIG. 9 is a diagram of an example system with more exemplary processes, according to some embodiments.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

DETAILED DESCRIPTION

As described above, mid-tier synchronization systems described herein may be suitable for use in non-relational database systems distributed across multiple remote locations. To this end, the present disclosure provides distributed computing techniques including a mid-tier server and a cloud-tier server configured for synchronization.

Overview of Synchronization Techniques for Distributed Systems

Figure 1:
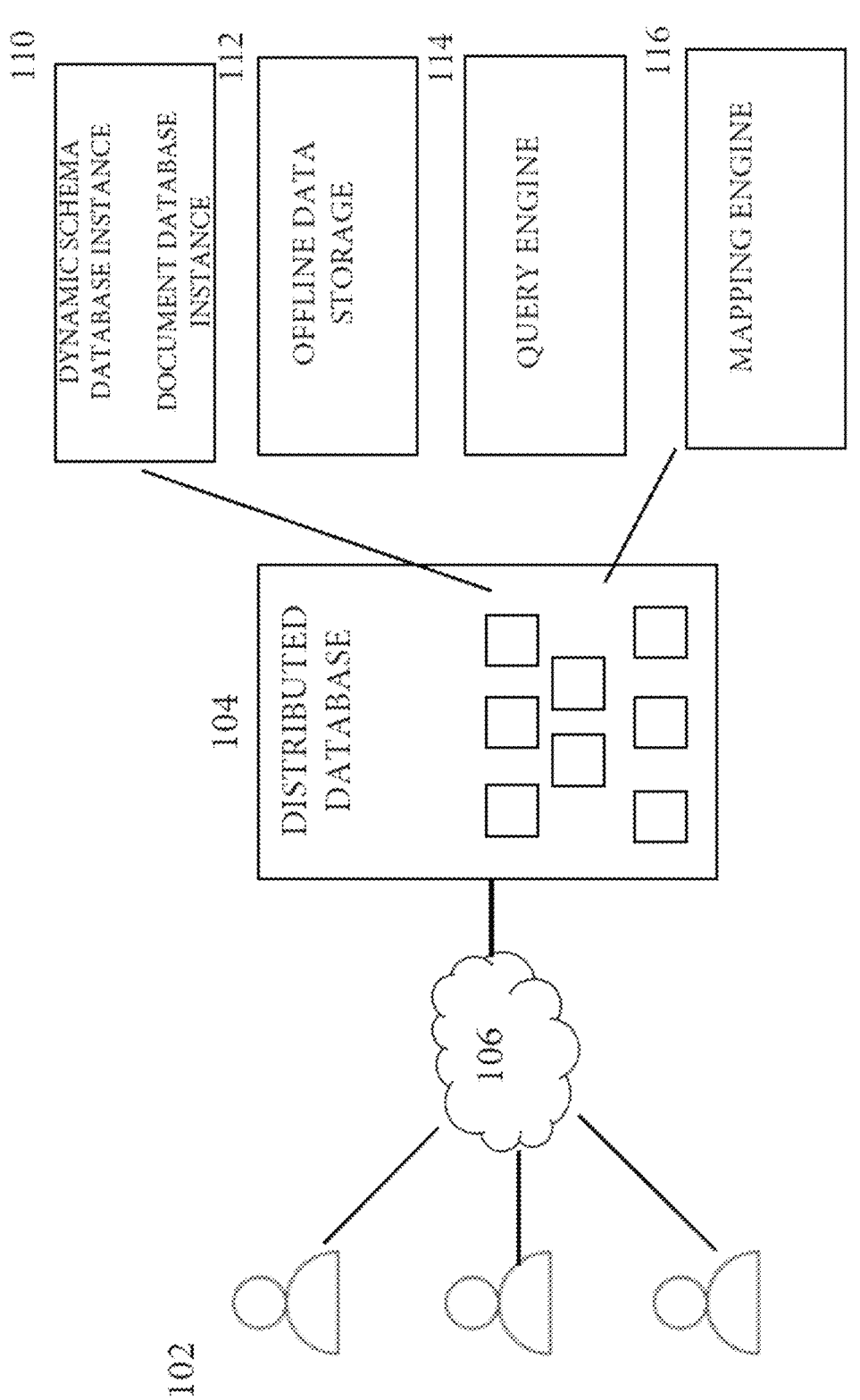
FIG. 1 is a block diagram of an example system with a distributed database, according to some embodiments.

FIG. 1 is a block diagram of an example system with a distributed database, according to some embodiments. Shown at 102, database clients and/or users can access a dynamic schema database 104 via a network 106. Users can submit queries that are executed by the database 104. In various embodiments, the database system can include a query engine configured to accept and process user queries and return data output via network 106. In some embodiments, the database 104 includes data under a dynamic or unstructured schema. Dynamic and/or unstructured databases do not enforce any data type limitations and can store structured and unstructured data. According to one embodiment, the known MongoDB database is an example of a dynamic and/or unstructured database. In MongoDB, data assets or base units of data are stored as BSON formatted documents. BSON are a binary serialization of java script object notation documents and store and transmit data objects consisting of attribute-value pairs, arrays (or other serializable values), and/or embedded documents.

For example, the database 104 can include a collection (e.g., a named logical grouping) of document data stored under a dynamic schema model at 110. The database 104 can also include other storage architectures and database instances (e.g., 112 offline storage or data lake storage). In various embodiments, the database includes a query engine 114 for processing any user queries and returning the results of the user queries. In some embodiments, the query engine is configured to execute an aggregation pipeline to process a user query on dynamic schema data. The known MongoDB database provides for aggregation operations that handle expressive queries efficiently on dynamic or unstructured data, as well as integrate with offline storage options. According to one embodiment, the database 104 can include an aggregation framework for processing queries according to a plurality of execution stages. MongoDB employs operators and execution of aggregations like $match, $unwind, $project, etc., to ensure efficient output from querying dynamic or unstructured data. Further embodiments introduce a $sql stage/aggregation operation to the aggregation framework to accept and interpret structured language queries to be executed on structured, dynamic, or unstructured data. In one example, the system and/or query engine 114 can include a mapping engine 116 configured to map incoming structured language queries into native operations that can leverage the full functionality of any underlying database implementation (e.g., MongoDB). In other embodiments, the mapping engine and/or query engine is configured to translate structured query statements into data environments and binding values that correspond to the structured queries. The definition of the operation's environment and corresponding binding values enables the query engine to accurately and consistently capture structured, non-structured and/or dynamic schema data without ambiguity or error.

In various embodiments, the query engine 114 and/or mapping engine 116 can be configured to identify structured query language query elements and manage their execution, for example, as part of a structured query language execution stage. In one example, the system is configured to accept queries from users who specify queries and/or portions of queries using specific query notation (e.g., $sql follow by query parameters). The query engine 114 and/or mapping engine can be configured to manage execution of the structured query language portion of the query and pass any output, to the user in response to the query or to another processing stage that employs the output of the prior stage for further processing. Similarly, the query engine 114 can be configured to execute other aggregation stages and pass their output to a $sql stage for further processing.

According to some embodiments, the query engine 114 and/or mapping engine 116 can be configured to process query functions in a $sql stage. The query engine 114 and/or mapping engine 116 can include processing rules and/or functions detailed in a query dialect configured to process structured query language, and may include mapping the structured query language into native expressive functions. In some embodiments, the mapping engine 116 can be called by the query engine as part of execution of an aggregation pipeline and/or stage. In other embodiments, the mapping engine can be a component or sub-component of the query engine, and in still others, the query engine can execute the functions described with respect to the mapping engine.

Embodiments herein merge the changes made by two or more mobile devices after the application of specific rules. The rules ensure that both sides always end up converging to the same result, even though they may have applied the changes in a different order. This means that there is no longer the kind of perfect consistency that one could have in a traditional database. Rather, embodiments herein provide what is termed strong eventual consistency. The tradeoff is that it is necessary to be aware of the rules to ensure the consistent result this is desired, but the upside is that by following a few rules one can have devices working entirely offline and still converging on meaningful results when they meet.

In some embodiments, data layers must choose two attributes out of consistency, availability, and partition-tolerance. The inventors have recognized that in the face of a network partition (i.e., some nodes of the system may be functioning, but unable to communicate) with some embodiments, nodes on both sides of the network partition may continue to write data (providing availability and partition-tolerance) and data will become consistent via a set of rules when all devices are online (i.e., eventual consistency). In some embodiments, the property is that devices are fully available offline and the rules are just part of the protocol that enable this.

At a very high level, the rules are as follows:

Deletes always win. If one side deletes an object it always stays deleted, even if the other side has made changes to it later on.

Last update wins. If two sides update the same property, the value ends up as the last updated.

Inserts in lists are ordered by time. If two items are inserted at the same position, the item that was inserted first ends up before the other item. This means that if both sides append items to the end of a list they end up in order of insertion time.

In some embodiments, a primary key is a property whose value uniquely identifies an object in a realm, just as a primary key in a conventional relational database is a field that uniquely identifies a row in a table. Primary keys are not required by all embodiments, but they can be enabled on any object type. One can add a property to a model class to use as the primary key, such as id, and then let the system know that property is the primary key. In some embodiments, the method for doing that is dependent on the language used; in Cocoa, override the primary Key ( ) class method, whereas Java and .NET use annotations.

Once a model class has a primary key, the system ensures that no other object can be added to the realm with the same key value. One can update the existing object; in fact, one can update only a subset of properties on a specified object without fetching a copy of the object from the realm.

In some embodiments, strings are special in that one can see them both as scalar values and as lists of characters. This means that the string can be set to a new string, replacing the entire string, or the string can be edited. If multiple users are editing the same string, conflicts should be handled at the character level, similar to the experience in applications such as Google docs.

In some embodiments counters are not exposed in all client APIs.

In some embodiments, using integers for counting is also a special case. The way that most programming languages would implement an increment operation (such as v+=1), is to read the value, increment the result, and then store it back. This obviously does not work if there are multiple parties doing it simultaneously; they may both read 10, increment it to 11, and when it merges one would get the result of 11 rather than the intended 12.

To support this common use case, embodiments offer a way to express the intent that a user is incrementing (or decrementing) the value, giving enough hints to the merge that it can reach the correct result. Just as with the strings above, it gives one the choice of updating the entire value, or editing it in a way that conveys more meaning, and allows more precise control of the conflict resolution.

Overview of Tiered Synchronization

The inventors have recognized that existing database implementations may only allow a sync-client to connect to cloud-based device sync servers which then store any synced data in a cloud database. This precludes users that have branch or remote locations that may be offline for extended periods of time and want or need to work during this time. One example scenario that may be precluded is a cruise ship on which computing devices may be interconnected over a local network but a remote network connection (e.g., beyond the cruise ship, such as over the Internet) may not be consistently available. Additionally, existing implementations often attempt to reduce the data, bandwidth, and latency involved when performing work at the branch or remote location. For implementations in which read-only data should be replicated down to every device at the branch, this data may be downloaded by each sync-client from the cloud. For writes coming from sync-clients that communicate with other local sync-clients, the data typically makes a round-trip to the cloud and back down to other local sync-clients before the sync-clients can effectively communicate about the data, resulting in high latency in local communications due to dependence on a remote connection.

Currently, there are no available solutions for these problems. If sync-clients are not able to connect to a cloud server, then the sync clients cannot sync their data with the cloud server or with any other locally-connected clients. Instead, the client's changes are configured to be stored locally within the machine, synced with the cloud sync server once the client is able to connect to the cloud server, and synced with other local clients once those local clients are also able to connect to the cloud server. In isolated scenarios such as a cruise ship with no internet connectivity, a client may not be able to sync changes with the cloud database or with other local clients for long periods of time on end.

Moreover, existing sync systems (deployed at any level) are inflexible. While some existing systems let app developers build reliable, offline-first mobile apps that serve data to millions of end users, such systems only work where data is compartmentalized and permissions rarely change, and are unsuitable for dynamic use cases with evolving permissions. Some existing systems split up data into chunks and define it at that level, and require data to live in separate partitions. In some such systems, only a static partition is able to be opened with a query, which may fail to satisfy the evolving nature of a business that necessitate changes to partitions.

Described herein are embodiments that allow a middle tier sync server (MTSS) to be deployed locally (e.g., on premises), which may allow clients connected to the MTSS to sync data with a cloud database and/or with other locally connected clients. In some embodiments, an MTSS may sync locally synchronized data with a cloud sync server. In some embodiments, whenever the MTSS receives data from the cloud sync server, the MTSS may push down those changes to its local clients. In some embodiments, if the MTSS is not able to establish a network connection with the cloud sync server, then the MTSS may wait until it can connect to the cloud sync server before syncing changes made locally. In some embodiments, the clients local to the MTSS may not need to connect to the cloud sync server frequently or at all, as clients may be able to synchronize changes with one another at the MTSS via a LAN. For example, the MTSS may appear to local clients as the cloud sync server, performing local synchronization and facilitating data interactions among clients locally, and pushing changes up to the cloud sync server when the connection thereto is available. Moreover, in some embodiments, clients may not need to connect to the cloud server directly and download the same data individually, as data (e.g., read-only data) may be downloaded to the MTSS from the cloud sync server once or only a few times, and then the MTSS may replicate the data (e.g., on a local database) to some or all local sync-clients.

In some embodiments, Tiered Device Sync enables deployment of an MTSS as a local version of a sync server at a location, enabling sync-clients to connect to the MTSS and replicate data. The data can be shared with sync-clients and merge conflicts, such as described herein. If the branch location loses connectivity, sync-clients may still be able to replicate data between local sync-clients in a conflict-free way. The MTSS may also store sync-client data as well, and then when connectivity is restored with the cloud, exchange any unsynchronized data with the cloud server, resolving any conflicts with shared cloud data that could have occurred while the middle tier was offline, and then replicate these changes to the remote sync-clients.

Some examples of architectures that may benefit from the tiered sync deployment described herein include the following. Apps used by pilots and personnel on airplanes to communicate within the airplane. Apps used by passengers and crew on cruise ships to order and deliver services or food. Point-of-sale (POS) apps used by servers in restaurants to take orders and communicate with the kitchen. Inventory management and retail apps in shopping centers to check levels of product and prices. Apps in a car that communicate with the passenger, driver, and onboard computer(s). Apps and sensors deployed at oil drilling rigs that gather and view measurements and readings locally. Areas that may benefit include energy production and distribution plants, retail warehouses, distribution centers, and stores, and restaurants (e.g., chain restaurants having a separate headquarters location).

Moreover, in some embodiments, systems described herein may be implemented flexibly at least partially at the middle-tier, such as performing any or all techniques described in Appendix A at the middle-tier.

In some embodiments, sync systems described herein may be implemented flexibly across at least 3 key domains: data, permissions, and schema. For data, some embodiments may define the subset of data synchronized via a query and dynamically update this within an application at any point in time while keeping data transfer efficient. For permissions, some embodiments may have field-level permissions that bind on session start and can be dynamically decided per session. For schema, some embodiments may provide data validation to be dictated at the field level and updated at any point, with provisions for handling invalid data at the client level.

In some embodiments, systems described herein may enable most complex use cases out-of-the-box without requiring any custom code. For example, custom code may be on network retry API logic. Such code can make something feel real-time/event-driven even if it is not. In some embodiments, all devices may have some subset of data from a backend store, but with no restrictions as to what that subset is (outside what is permitted by read/write permissions).

In some embodiments, evolving permissions may be possible. For example, with a school database including students, teachers, principals, each has different levels of access. Students can read their data, maybe with some write access; teachers can read their data and write to some data; principals can access almost everything, both read and often write. This non-limiting example of a school is provided to illustrate how permissions may be configured to a given use case, and it is appreciated that other use cases may leverage different permissions configurations.

In some embodiments, partitions may be avoided. Some embodiments herein allow splitting up data dynamically, which helps avoid the limitations of partitions in some cases.

Illustrative Examples for Terminology Used Herein

As described herein, a sync-client may be a client computing device that may interact with data objects and/or request synchronization with a server, whether directly to a cloud-tier server (e.g., over a remote network connection) or via a mid-tier server (e.g., via a local network connection). Realm SDK apps with Device Sync configured. These could connect to a mid-tier server or to a cloud-tier server.

As described herein, a middle tier synchronization server (MTSS), or a mid-tier server (e.g., an edge server and/or an edge sync server) may be configured to provide a local instance of a sync server that clients may connect to (e.g., over a local network connection, e.g., LAN). A mid-tier server may be configured to connect to a cloud-tier server (e.g., with the MTSS acting as a client) for synchronization. An MTSS may be deployed at a particular location (e.g., on an island) and/or onboard a vehicle (for example, on a cruise ship). An MTSS may have a local database (e.g., non-relational database) to interact with (e.g., to read, store, and/or manipulate data). An MTSS may be configured to operate as a sync server deployed on local hardware at the location. An MTSS may be configured to both service local sync-clients as well as replicate data via sync between local clients and the cloud-tier server. In some embodiments, one or more additional servers may be implemented between local clients and an MTSS, such as an intermediate-tier server. For instance, an MTSS may be configured to act solely as a sync server in some cases, with another server performing other server-related tasks.

As described herein a cloud sync server or cloud-tier server may be implemented as a cloud-tier synchronization server deployed over the Internet with a database (e.g., non-relational database) that may be distributed over many locations and/or database nodes. A cloud sync server may include App Services servers deployed on cloud providers along with database clusters of distributed data.

Example Tiered Synchronization System

Figure 2:
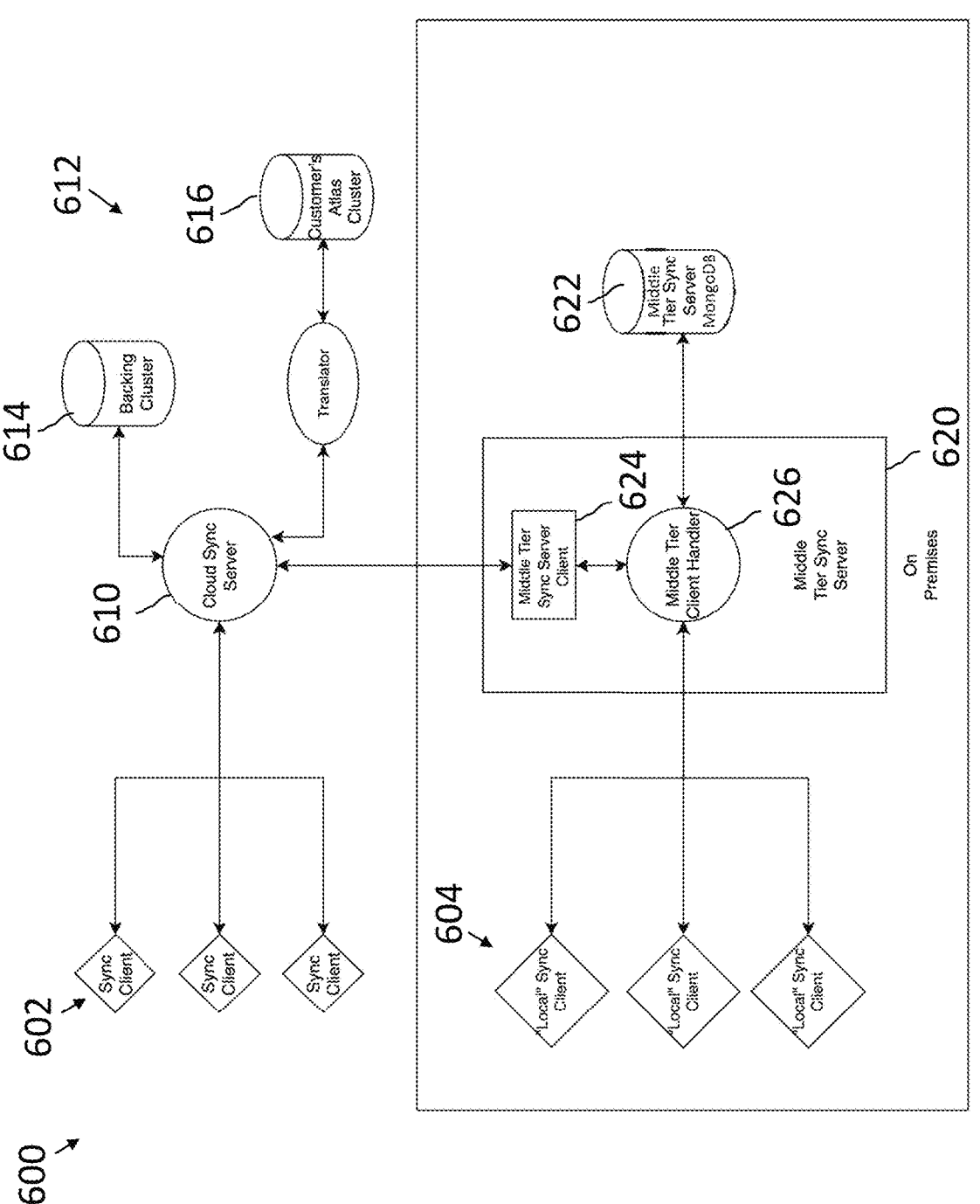
FIG. 2 is a diagram of an example tiered synchronization system including a mid-tier server and a cloud-tier server, according to some embodiments.

FIG. 2 is a diagram of an example tiered synchronization system 600 including a mid-tier server 620 and a cloud-tier server 610, according to some embodiments.

As shown in FIG. 2, a cloud-tier server 610 may be in communication with a distributed (e.g., non-relational) database 612 including a primary (e.g., Atlas configured) cluster 616 and a backing cluster 614. For example, while each is shown using a single component, each cluster 614, 616 may include nodes distributed over many locations. Further shown in FIG. 2, the cloud-tier server 610 may be in communication (e.g., directly) with sync clients 602, such as computing devices that may be configured to communicate with the cloud-tier server 610 directly over a remote network connection (e.g., the Internet). In some embodiments, each computing device may be configured to operate a local instance of a database application that communicates with the cloud-tier server 610, and/or a computing device may be configured to communicate with the cloud-tier server 610 using web browser operations.

As further shown in FIG. 2, a mid-tier server 620 may be communication with a mid-tier (e.g., non-relational) database 622 (e.g., a MongoDB database). For example, the mid-tier database 622 may be located entirely on location with the mid-tier server 620, though in some cases a mid-tier database 622 may be at least partially distributed. In the illustrated example, the mid-tier server 620 does not include a translator, as may not be required in at least some cases. Further shown in FIG. 2, the mid-tier server 620 may be in communication (e.g., directly) with sync clients 604 that are local to the mid-tier server 620. For example, local sync clients 604 may be within a predetermined distance of the mid-tier server 620, and/or may be in communication with the mid-tier server 620 over a local network connection (e.g., LAN), and/or may have a constant (e.g., local) network connection to the mid-tier server 620, as opposed to an intermittent network connection to the cloud-tier server 610 at least in some cases. In some embodiments, sync clients 604 may be configured only to interact with the mid-tier server 620. For example, local instances of database applications and/or web browser operations executed on local sync clients 604 may at least default to (e.g., and/or require) communication over a local network connection to the mid-tier server 620 rather than to the cloud-tier server 610, though in other cases local sync clients 604 may communicate directly with the cloud-tier server 610.

In some embodiments, the cloud-tier server database 612 may be in communication with the mid-tier server database 622 over the remote network connection. For example, the mid-tier server 620 and the cloud-tier server 610 may be remote with respect to one another. For instance, the mid-tier server 620 may be physically located in a location with intermittent access to the remote network connection (e.g., the Internet). Examples of locations with intermittent access to a remote network connection may include a vehicle (e.g., land, such as car or truck; air, such as airplane or helicopter; and/or sea, such as boat or submarine) and/or a static location with sporadic environmental conditions (e.g., storms, volcanic eruptions, etc.). In other cases, the mid-tier server 620 may be located in a location with substantially reliable remote network connection access, though it may be desirable to limit communications over the remote network connection due to latency, capacity, and/or cost limitations.

In some embodiments, the mid-tier database 622 (e.g., a non-relational portion thereof) may be configured to store mid-tier data corresponding to a subset of cloud-tier data stored in (e.g., a non-relational portion of) the cloud-tier database 612. For example, only a subset of the cloud-tier data may be useful for data interaction at the mid-tier server 620. For instance, where the mid-tier server 620 is deployed on a cruise ship, the subset of the cloud-tier data may include read-only data frequently used onboard the cruise ship (e.g., current onboard restaurant prices) and/or writable data (e.g., quantity of restaurant items purchased over time) frequently updated onboard the cruise ship.

In some embodiments, the mid-tier server 620 may be configured to provide access to the mid-tier data to one or more clients (e.g., sync clients 604) over a local network (e.g., LAN). For example, sync clients 604 may be configured to access the mid-tier data by connecting over the local network to the mid-tier server 620. In some embodiments, the mid-tier server 620 may be configured to provide, to one or more clients (e.g., sync clients 604), access to the mid-tier data and to request, from the cloud-tier database 612, access to data stored in (e.g., the non-relational portion of) the cloud-tier database 612 that is not stored in (e.g., the non-relational portion of) the mid-tier database 622. For example, where the data for which access is requested includes status information for a vehicle on which the mid-tier server 620 is deployed, the data may be stored on the mid-tier server database 622 and access may be provided via the mid-tier server 620, whereas where the data includes fleet status information for other vehicles, which is not stored on the mid-tier server database 622, the data access may be requested via the mid-tier server 620 from the cloud-tier database 612.

In some embodiments, a mid-tier server 620 may be configured to, independent of the remote network connection, synchronize the mid-tier server database 622 with data interactions between client systems (e.g., sync clients 604) and the mid-tier server 620 over the local network connection. For example, the mid-tier server 620 may be configured to, independent of the remote network connection, respond to requests to access data stored in the mid-tier server database 622, the requests received from client systems (e.g., sync clients 604) over the local network connection. For instance, in the above example, requests to access vehicle status information stored in mid-tier server database 622 may be processed and completed without needing to communicate over the remote network connection to the cloud-tier server database 612.

In some embodiments, the remote network connection from the mid-tier server 620 to cloud-tier server 610 may be independent of the local network connection from the mid-tier server 620 to sync clients 604. For example, the sync-clients 604 may appear to the cloud-tier server 610 as only the mid-tier server 620 in some cases. For instance, upload messages from the mid-tier server 620 to the cloud-tier server 610 may be tied to a file ident for a client instance (e.g., 624) that is internal to the mid-tier server 620. In the same or another example, file indents for sync-clients 604 communicating with the mid-tier server 620 may be monitored by the mid-tier server 620, such as without necessarily exposing the file idents for sync-clients 604 to the cloud-tier server 610. For instance, where the sync-clients 604 also communicate the cloud-tier server 610 directly, the sync-clients 604 may use different file idents.

In some embodiments, the mid-tier server 620 may be configured to handle conflict resolution (e.g., using Operational Technology) among data interactions involving local sync clients 604. For example, the mid-tier server 620 may be configured to handle conflict resolution for uploads from sync clients 604, and/or compensating writes, and/or discovered objects (e.g., how the cloud-tier server 610 may for sync clients 602). In some embodiments, the mid-tier server 620 may be further configured to handle conflict resolution on download messages received from the cloud-tier server 610, and to propagate such messages to local sync clients 604 as download messages.

In some embodiments, the mid-tier server 620 may be configured to, when the mid-tier server 620 is connected to the cloud-tier server database 612 over the remote network connection, synchronize the mid-tier server database 622 with the cloud-tier server database 612. For example, the mid-tier server 620 may be configured to, when connected to the cloud-tier server database 622 over the remote network connection, request access to data stored in the cloud-tier server database 622 in response to requests to access data not stored in the mid-tier server database 622, the requests received from client systems (e.g., sync clients 604) over the local network connection. For instance, requests for data from the client systems may be merged (e.g., intersected) with and/or into a request from the mid-tier server 620 for data stored in the cloud-tier server database 612.

In some embodiments, the mid-tier server 620 may be configured to periodically check the remote network connection and, in response to detecting that the mid-tier server 620 is connected to the cloud-tier server database 612 over the remote network connection, synchronize the mid-tier server database 622 with the cloud-tier server database 612. For example, the mid-tier server 620 may be configured to execute an algorithm that periodically checks whether the remote network connection is available, and when the remote network connection becomes available after some time has passed and/or since changes have been made to the mid-tier data in the mid-tier server database 622, the mid-tier server 620 may be configured to initiate synchronization with the cloud-tier server database 622.

In some embodiments, the mid-tier server 620 may be configured to synchronize the mid-tier data with the cloud-tier data when the mid-tier data is modified by one or more clients (e.g., sync clients 604), and the mid-tier server 620 detects the modification over the local network. For example, while the mid-tier server 620 is disconnected from the cloud-tier server 610, the mid-tier server may be configured to update the mid-tier data when modified by a first client 604 and provide updated mid-tier data to a second client 604. In this example, when the mid-tier server 620 is reconnected to the cloud-tier server 620 after being disconnected from the cloud-tier server 610, the mid-tier server 620 may be configured to update the subset of cloud-tier data based on the updated mid-tier data.

In some embodiments, the mid-tier server 620 may be configured to synchronize the mid-tier data with the cloud-tier data when the mid-tier data is modified at the cloud-tier server 610, and the mid-tier server 620 detects the modification over the remote network connection (e.g., the Internet). For example, the cloud-tier server 610 may be configured to upload changes to the mid-tier server 620 when the remote network connection is available, which the mid-tier server 620 may be configured to receive and use as a basis for detecting changes for synchronizing.

In some embodiments, a mid-tier server 620 may be configured to (e.g. independent of the remote network connection) act as a server for local sync clients 604 and as a client of the cloud-tier server 610. For example, as shown in FIG. 2, the mid-tier server 620 is shown including a mid-tier client handler 626, which may be configured to exchange messages with local sync clients 604 (e.g., over LAN) as a server port, and the mid-tier server 620 is further shown including a mid-tier sync server client 624, which may be configured to exchange messages with the cloud-tier server 610 (e.g., over the Internet) as a client port (e.g., when connected to the cloud-tier server 610 over the Internet).

In some embodiments, a mid-tier server 620 such as shown in FIG. 2 may be runnable via a command line binary or image. In some embodiments, it may be possible to specify a config file containing the connection string for the cloud database cluster or cloud-tier server 610 the mid-tier server 620 may connect to, the connection string for the cloud-tier server 610, the authentication parameters that may be required for connecting with the cloud-tier server 610, the file where logs may be stored, and the query the mid-tier server 620 may use when connecting with the cloud-tier server 610. In some cases, the connection string may default to a particular cloud-tier server 610 specified by the service provider to the client. If a log file is unspecified, a default log file may be used instead. The query may have the same format as queries used for interacting with the cloud-tier server 610 directly. In some cases, a sync-client 604 may be configured to connect to the mid-tier server 620 by specifying an address of the mid-tier server 620.

In some embodiments, when a mid-tier server 620 starts up (e.g., as part of initialization), it may be configured to fetch some data from the cloud-tier server 610 so that the mid-tier server 620 can begin accepting connections to sync clients 604 and syncing data for the sync-clients 604. The mid-tier server 620 may be configured to obtain the app configuration details (e.g., a config file as described above) such as including permissions, schema, and sync settings. For example, permissions for the mid-tier server 620 may correspond to a subset of permissions specified for the cloud-tier server 610, such as corresponding to the mid-tier data, which may change depending on the amount and/or portion of cloud-tier data stored on the mid-tier server database 622. In addition, the mid-tier server 620 may be configured also to pull an initial snapshot of data from the cloud-tier server 610. In some embodiments, a mid-tier server 620 may be configured to store all mid-tier data in a single non-relational cluster (e.g., MongoDB cluster), which may correspond to a subset of the cloud-tier data stored on a backing and general cloud cluster. In some embodiments, closure of the cloud-tier server 610 may cause resulting closure and/or reassignment of the mid-tier server 620. In some embodiments, a mid-tier server 620 may be configured with a maximum amount of mid-tier data storage (e.g., corresponding to and/or independent of the size of the cloud-tier data and/or the capacity of the mid-tier server database 622).

In some embodiments, a mid-tier server 620 may be configured to get sync app configuration details (e.g., config file) from the cloud-tier server 610. The app configuration settings that may be obtained include schema, rules, authentication providers, and client user data settings. In a first example, an endpoint on the cloud-tier server 610 may be exposed to return the configuration data (e.g., in JSON format). As another example, updates to the sync protocol may be introduced so that the cloud-tier server 610 is configured to send the configuration data via download messages to the mid-tier server 620. One benefit of the first example is that it may not require updates to the sync protocol. Another benefit of the first example is that some sync implementations may already support returning an app config file in JSON. It should be appreciated, however, that other examples (e.g., the second example) may be implemented where convenient.

In some embodiments, to grab an initial state of data from the cloud-tier server 610, the mid-tier server 620 may have its own internal client 624 execute a bootstrap of data from the cloud-tier server 610 using a query from the mid-tier server 620. This may be accomplished via a Mark message once the internal client 624 connects to the cloud-tier server 610. The data pulled in via the bootstrap may then be stored in the server history store of the mid-tier server 620 along with the state store. Once the mid-tier server 620 has pulled in the bootstrap data, then it may start accepting sync-client connections (e.g., which may resemble how a cloud-tier server 610 may not accept client connections until it has completed initial sync). It should be appreciated that some embodiments may not use a client 624 internal to the mid-tier server 620 to communicate with the cloud-tier server 610, as communications may be established directly therebetween.

In some embodiments, another way the mid-tier server 620 may be configured to pull in initial data to use is that it can initiate an initial sync directly against an existing cloud-tier server 610 but only pulling changes that are in its current query view. This alternative may have downsides in some implementations, such as potentially requiring an update to the initial sync algorithm to respect a query, requiring a way to coordinate the server versions for initially synchronized data with the current versions of the cloud-tier server 610. In some embodiments, an initial data set may be specified in a flexible synchronization query from the mid-tier server 620.

In some embodiments, a mid-tier server 620 may be configured to handle interactions with sync-clients 604 as the cloud-tier server 610 would from sync clients 602. In some embodiments, the only significant difference may be that some or all queries from sync-clients 604 would be logically "ANDed" with the mid-tier server 620 query to the cloud-tier server 610. This may be implemented in some embodiments to ensure that sync-clients 604 do not make writes outside the query from the mid-tier server 620, as these may generate compensating writes. To accomplish this in such embodiments, the mid-tier server 620 may be configured to expressly or implicitly perform a logical "AND" operation with its own query and some or all incoming queries from sync-clients 604. To provide visibility on the side of sync-clients 604 for this approach, the mid-tier server 620 may be configured to send a message to the sync-client 604 that its query is being modified.

As an alternative or additional example, some or all sync-clients 604 may have the query from the mid-tier server 620 logically intersected (e.g., by AND operation) with the query of the sync-client 604 when the sync-client 604 connects to the mid-tier server 620. This approach may be difficult in some embodiments because each sync-client 604 may have to know the query of the mid-tier server 620 before connecting to the mid-tier server 620. In addition, the query of the sync-client 604 may be parsed on the mid-tier server 620 to detect if the query of the mid-tier server 620 is a part of the query of the sync-client 604.

In some embodiments, a mid-tier server 620 may be configured to handle and track file idents for its associated (e.g., connected) sync-clients 604 independently of the cloud-tier server 610. One assumption may be that, should sync-clients 604 decide to switch between connecting with the mid-tier server 620 and another sync server (e.g., another mid-tier server 620 and/or the cloud-tier server 610 directly), sync-clients 604 may be configured to use a different file ident for each server. This may not require any changes to the implemented code in some cases.

In some embodiments, a tiered synchronization system such as shown in FIG. 2 may facilitate implementation of synchronized data storage and access in a distributed database system. For example, an easy to install containerized solution may be installed at a remote (e.g., branch) location that contains a standalone instance of a non-relational database and associated services for performing synchronization to this local instance and to the cloud-tier server. In some embodiments, a mid-tier server may be configured to perform synchronization and conflict resolution for local sync-clients and synchronize with the cloud-tier server. For example, conflict resolution may only be performed for interactions with sync-clients (e.g., 604) at the same location (e.g., over a local network). For instance, sync-clients 604 may not have to perform conflict resolution with other sync-clients 604 (e.g., at the same location and/or over the same local network connection). In some embodiments, mid-tier servers may be configured to perform conflict resolution only with a cloud-tier server.

In some embodiments, sync clients and/or the mid-tier server may be configured to register to the cloud-tier server first and be issued authentication tokens as in a solely cloud-based system. For example, the mid-tier server may be configured to authenticate to the cloud-tier server and may identify itself (e.g., as part of a secured login process). In one implementation, the mid-tier server may be issued a one-time-use token when installed, which may be submitted to the cloud-tier server to obtain an API token associated with the mid-tier server for future communications, and which may be revoked via the cloud-tier server. In some embodiments, a mid-tier server may be configured to enforce user permissions at the mid-tier location (e.g., for data interactions with sync clients 604). For example, the middle tier sync-server may be configured to match permissions of the cloud-tier server configuration. In some embodiments, the mid-tier server may have a services configuration executed locally in order to perform data interaction operations, which services configuration may align with the cloud configuration. In some embodiments, an enabling condition for operation may be that the mid-tier server and cloud-tier server configurations (e.g., schema and/or sync parameters) match and/or are specified by an operator manually. In some embodiments, permissions may be configured to restrict sync-client 604 access to mid-tier data to only a specified portion of the mid-tier data. In some embodiments, the mid-tier server 620 may be configured to receive configuration updates from the cloud-tier server 610, which may cause the mid-tier server 620 to reboot to apply the updates.

In some embodiments, an operator of a may set data at the mid-tier server database by creating a flexible sync query for the mid-tier server database on behalf of some or all sync clients (e.g., 604). For example, this process may be implemented dynamically, such as by forwarding queries from sync-clients 604. Alternatively or additionally, multiple sets of permission roles may be implemented, such as between sync-clients and the mid-tier server, where the role and filter may be used to seed data. In some embodiments, security rules may be configured at the mid-tier server 620 level.

In some embodiments, sync-clients 604 may be configured to sync with a mid-tier server via a network configuration over an existing sync-client Websocket implementation (e.g., used for cloud-tier sync connections). For example, sync-clients 604 may be authenticated and trusted such as using JWT and/or API-token authentication. In some embodiments, the middle tier sync server may be secured locally (e.g., within the LAN). In some embodiments, sync-clients 604 may be configured to access the mid-tier server 620 using an open API over the local network connection that has secured access controls. For example, the API may have an endpoint that permits a credentialed authority to monitor connectivity status, errors, logs, alerts, and/or metrics, whether via querying and/or a user interface. In the same or another example, such information may be uploaded to the cloud-tier server 610 (e.g., when available) for monitoring remotely. In some embodiments, sync-clients 604 may have network parameters configured and authentication to synchronize with the mid-tier server 620 over the local network connection.

In some embodiments, a mid-tier server may be configured to handle compensating writes as they occur. In some embodiments, local sync-clients (e.g., 604) may provide a strict subset of the query of their mid-tier server. In some embodiments, a sync-client (e.g., 604) may be configured to request certain metadata from the mid-tier server for the query to be a subset of the mid-tier server's query. In some embodiments, the mid-tier server may be configured to generate logs locally.

Example Bidirectional Communication Between Cloud-Tier and Mid-Tier Server

Figure 3:
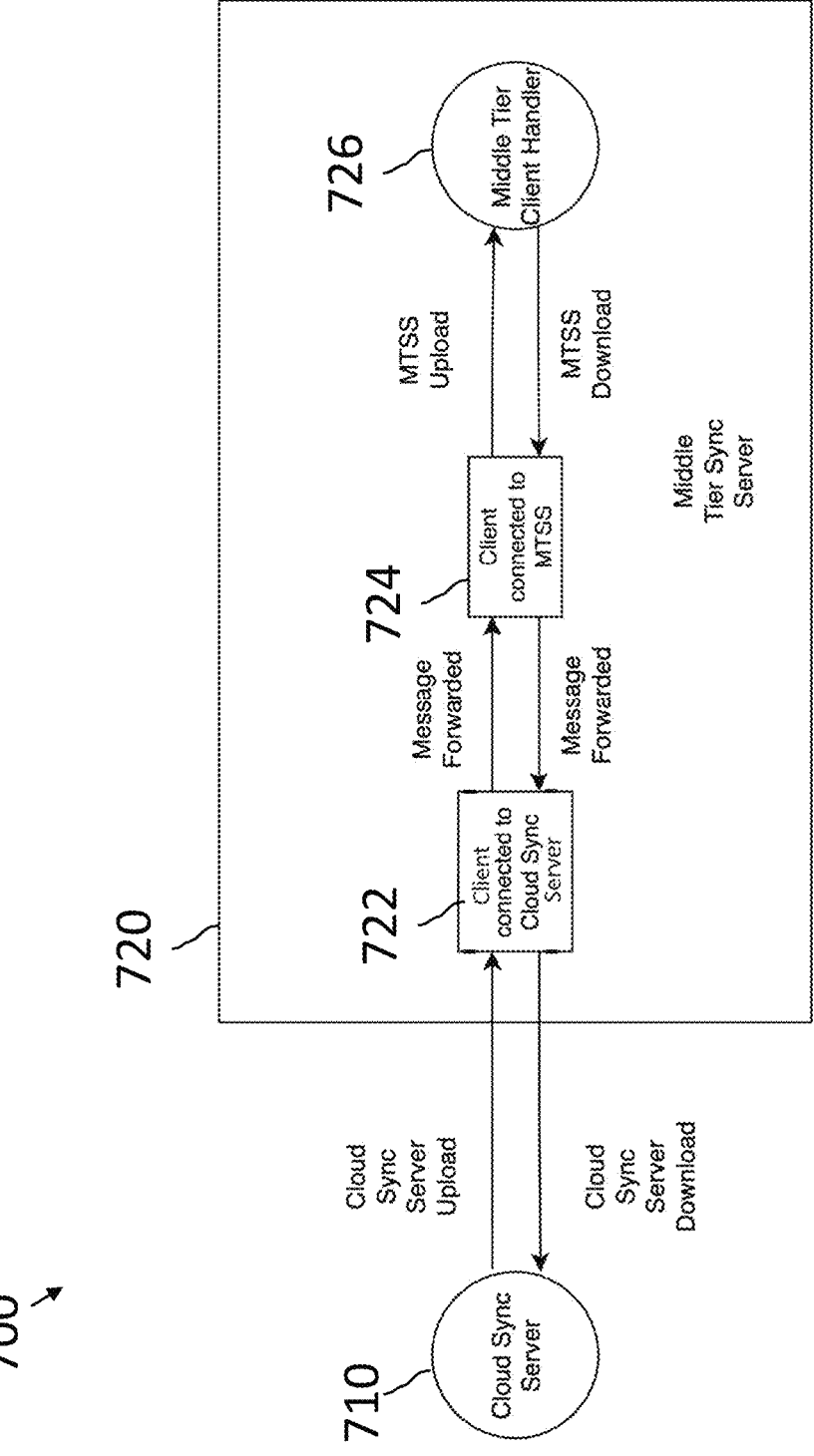
FIG. 3 is a diagram illustrating data transfer in a tiered synchronization system between a mid-tier server and a cloud-tier server performing tiered synchronization, according to some embodiments.

FIG. 3 is a diagram illustrating data transfer in a tiered synchronization system 700 between a mid-tier server and a cloud-tier server performing tiered synchronization, according to some embodiments.

In some embodiments, a mid-tier server may be configured to maintain two bidirectional connections. For example, one bidirectional connection may provide communication between the mid-tier server and a cloud-tier server (e.g., with the mid-tier server configured as a client of the cloud-tier server), and another bidirectional connection may provide communication between the mid-tier server and a local client (e.g., with the mid-tier server configured as a server for the local client). As described further below, a client instance internal to an MTSS may be configured to process downloads from the cloud sync server as uploads for the MTSS and process downloads from the MTSS as uploads for the cloud sync server. In some cases, two client instances internal to the MTSS may be used: one to connect to the cloud sync server and one to connect to the MTSS. Other numbers of client instances may be implemented depending on the implementation.

FIG. 3 illustrates one example of how a mid-tier server 720 and a cloud-tier server 710 may interact with each other via two client instances 722, 724 internal to the mid-tier server 720. As shown in FIG. 3, a first internal client 722 is configured to communicate bidirectionally with the cloud-tier server 710 and a second internal client 724 is configured to communicate bidirectionally with a mid-tier client handler 726. For instance, the mid-tier client handler 726 may be configured as a server instance that communicates with some or all local clients (e.g., over a local network connection).

In some embodiments, certain updates may be implemented to ensure both internal MTSS clients 722, 724 can connect to both the MTSS client handler 726 and the cloud-tier server 710, respectively. As one example, a back-off algorithm may be implemented for connection tries to the cloud-tier server 710. In some embodiments, an MTSS QBS Client Metadata Store may be updated to store metadata for both internal MTSS clients 722, 724 and to distinguish the metadata between the internal MTSS clients 722, 724. In some embodiments, client metadata for the first internal MTSS client 722 may be stored on the mid-tier server database (e.g., over local network connection), but the metadata may be used to connect to the cloud-tier server 710.

In some embodiments, downloads sent to the second internal client 724 from the MTSS client handler 726 may be processed as uploads for sending to the cloud-tier server 710 and downloads sent to the first internal client 722 from the cloud-tier server 710 may be processed as uploads for sending to the MTSS client handler 726. For example, download messages may be transformed into upload messages and then forwarded to the respective server 710, 720. In some embodiments, transforming downloads into uploads may include swapping the client and server versions on the changesets in the messages. For instance, mid-tier server 720 versions may be processed as client versions for the cloud-tier server 710, and cloud-tier server 710 versions may be processed as client versions for the mid-tier server 720.

As shown in FIG. 3, the second internal client 724 may be configured to forward messages from the mid-tier client handler 726 to the first internal client 722, and the first internal client 722 may be configured to forward messages from the cloud-tier server 710 to the second internal client 724. For instance, when a cloud-tier server upload message is received at first internal client 722, the first internal client 722 may be configured to process the message as a cloud-tier upload message (e.g., a download from the perspective of the mid-tier server 720) and forward to the second internal client 724, from which the mid-tier client handler 726 may be configured to process the message as an upload to the mid-tier server 720 (e.g., as though received from a local client). Similarly, when mid-tier client handler 726 provides a download message to second internal client 724 (e.g., as though second internal client 724 were a local client), the second internal client 724 may be configured to forward the message to the first internal client 722, which may be configured to process the message as a cloud-tier download message (e.g., an upload from the perspective of the mid-tier server 720) when sending to the cloud-tier server 710.

In some embodiments, transformation of downloads into uploads may be performed by, as a first step, for each changeset, creating a new changeset with the same instructions, and for the changeset info, swapping the client version and the server version with one another. As a second step, for a new upload message to be sent (e.g., to the MTSS client handler 726), set the server version to the current upload progress client version and set the client version to the current download progress server version. As a third step, for the new upload message, use the session ident from the internal client that did not directly receive the download message (e.g., second internal client 724). For example, when transforming a download message received by the second internal client 724 from the MTSS client handler 726, then the session ident from the first internal client 722 will be used since the first internal client 722 will end up sending the upload message to the cloud-tier server 710.

In some embodiments, for conflict resolution, both internal clients 722, 724 may be configured to ensure that when they receive downloads from a server 710 or 720, that the incoming changes are checked against the client's history under Operational Technology (OT) techniques. However, the mid-tier server 720 history may be processed as the client history for the first internal client 722 and the cloud-tier server 710 history may be processed as the client history for the second internal client 724. In some embodiments, instead of having an internal client 722, 724 perform an OT check on incoming downloads, the client may forward the incoming download messages as uploads to each respective sync server, such as in the following example.

As a first step, the cloud-tier server 710 sends a download message to the first internal client 722. As a second step, the first internal client 722 receives the download message from the cloud-tier server 710 and forwards to the second internal client 724. As a third step, the second internal client 724 sends the received download message as an upload message to the MTSS client handler 726. In some embodiments, the client version provided to the MTSS client handler 726 on the upload is configured to be the server version received from the cloud-tier server 710 on the download. In some embodiments, the file ident is configured to be the one the second internal client 724 is using to connect to the MTSS client handler 726. As a fourth step, the MTSS client handler 726 receives the upload message and integrates it into its server history using OT techniques. In some embodiments, by this point, the first internal client 722 now has integrated the download message it received from the cloud-tier server into its client history, where the server history of the MTSS client handler 726 is processed as the client history of the first internal client 722. Thus, in some cases, OT may be achieved even though the first internal client 722 did not interact directly with the MTSS client handler 726 as its client.

In some embodiments, acknowledgement of server and/or client versions may be kept in sync between the mid-tier server 720 and the cloud-tier server 710. As one example, the rules may be employed, such as the last acknowledged client version the MTSS client handler 726 indicates to the second internal client 724 on download messages is the latest acknowledged server version the first internal client 722 can indicate to the cloud-tier server 710. Another rule that may be employed is that the last acknowledged client version the cloud-tier server 710 indicates to the first internal client 722 on download messages is the latest acknowledged server version the second internal client 724 can indicate to the MTSS client handler 726. In some embodiments, these or similar rules may ensure that a server version is only acknowledged from one server (e.g., mid-tier server 720) after the other server (e.g., cloud-tier server 710) acknowledges that same version as a client version, therefore indicating that the other server (e.g., cloud-tier server 710) has successfully integrated the changes from the one server (e.g., mid-tier server 720).

In some embodiments, an internal client 722, 724 may be configured to send uploads by scanning its client history and to integrate downloads into client history via an integrator. In some embodiments, the internal clients 722, 724 may not store any client history when forwarding download messages as upload messages. As such, uploads may not need to be served via scans on client history.

In some embodiments, interactions between internal clients 722, 724 may be facilitated using a data structure referred to herein as QBSTieredCoordinator. In some embodiments, the QBSTieredCoordinator may be configured to maintain the state for both internal clients 722, 724 and ensure that the messages get forwarded between both internal clients 722, 724 correctly. In some embodiments, the QBSTieredCoordinator may be configured to create two channels through which both internal clients 722, 724 can pass through the converted download to upload messages. In some embodiments, the QBSTieredCoordinator may be configured to receive the converted upload messages on the two channels and then use the respective clients to send the upload messages to the respective servers 710, 720.

In some embodiments, an integrator referred to herein as ForwardingIntegrator may be configured to process download messages on both internal clients 722, 724. In some embodiments, the integrator may be configured to transform incoming download messages into upload messages and swap the server/client versions on each of the changesets. In some embodiments, after the transformation, the integrator may be configured to send the new upload messages on a channel which is the same channel the QBSTieredCoordinator is configured to read upload messages off of to send to the respective sync server. In some embodiments, a ForwardingIntegrator struct can be reused between both internal clients 722, 724 since for both internal clients 722, 724 the struct may be configured to perform a same transformation on download messages.

In a first example without OT techniques, the mid-tier server 720 initially has server version 10 and has integrated server version 35 from the cloud-tier server 710. The second internal client 724 is connected with file ident 2 and with session ident 5. The first internal client 722 is connected with file ident 4 and with session ident 7. The cloud-tier server 710 initially has server version 35 and has integrated server version 10 from the mid-tier server 720.

While in this initial configuration, a sync-client (e.g., 604 in FIG. 2) uploads a single changeset to the mid-tier server 720, and the mid-tier server 720 reaches server version 11. Next, in this example, the mid-tier server 720 sends a download to the sync-client with a server version of 11 and a client version of 35. In this case, the client version on the download message is 35 since the mid-tier server 720 has integrated server version 35 from the cloud-tier server 710. Next, ForwardingIntegrator may process the changeset in the download and swap the server version and client version. In this case, the changeset is configured to originally have a server version of 11 and a client version of 35, and the new changeset server version is 35 and the client version is 11. Next, ForwardingIntegrator may create an upload message and set the correct information. In this case, session ident may be set to the first internal client 722 session ident, which is 7. The progress client version may be set to the download message's download server version, which is 11 in this case, and which may thereby leverage the mid-tier server 720 server versions as client versions for uploads to the cloud-tier server 710. The progress server version may be set to the download message's download client version, which is 35 in this case, thereby indicating to the cloud-tier server 710 that the cloud-tier server 710 server version 35 has been integrated by the mid-tier server 720. At this point, the changesets may be set to the transformed changesets.

As the next step, QBSTieredCoordinator may take the generated upload message and send it to the cloud-tier server 710, and the cloud-tier server 710 may receive the upload message. The cloud-tier server 710 may then integrate the changesets and reach a server version of 36. In some embodiments, the mid-tier server 720 may not receive an indication of whether the download sent to the second internal client 724 was integrated at the cloud-tier server 710.

In a second example with OT techniques, the mid-tier server 720 initially has server version 10 and has integrated server version 35 from the cloud-tier server 710. The second internal client 724 is connected with file ident 2 and with session ident 5. The first internal client 722 is connected with file ident 4 and with session ident 7. An Object A {_id: TestID, arrField: [1,9]} is stored in the mid-tier server database. The cloud-tier server 710 initially has server version 35 and has integrated server version 10 from the mid-tier server 720. The Object A {_id: TestID, arrField: [1,9]} is stored in the cloud-tier server database consistent with the version in the mid-tier server database.

While in this initial configuration, in this example, a sync-client (e.g., 604) may upload a single changeset to the mid-tier server 720 at time T1. The changeset is given by an ArrayInsert {ObjectA.arrField, prior_size: 2, pos: 1, payload: 20}. The mid-tier server 720 may integrate the upload and reach server version 11.

At time T2 (later than T1), a sync-client (e.g., 602) may upload a single changeset to the cloud-tier server 710. The changeset is given by an Array Insert {ObjectA.arrField, prior_size: 2, pos: 1, payload: 53}. The cloud-tier server 710 may integrate the upload and reach server version 36.

At some point following T2, the mid-tier server 720 may send a download to the second internal client 724 with the changeset for the server version 11. The second internal client 724 integrator may process the download message and changesets. The new changesets server version is 35 and the client version is 11 in this case. The session ident may be set to the session ident of the first internal client 722, which is 7 in this case. The progress client version may be set to the download message's download server version, which is 11 in this case. The progress server version may be set to the download message's download client version, which is 35 in this case. QBSTieredCoordinator may then send the upload message to the cloud-tier server 710.

Next, the cloud-tier server 710 may receive the upload message with a progress client version of 11 and a progress server version of 35. The changeset on the message has a client version of 11 and the server version of 35. The cloud-tier server 710 may perform OT on the uploaded changeset and integrate it. In this case, since the server version on the upload is 35 and the latest server version of the cloud-tier server 710 is 36, the merge window may include the changeset at version 36 for the cloud-tier server 710.

In this case, the two changesets undergoing OT are an incoming changeset given by: {ObjectA.arrField, prior_size: 2, pos: 1, payload: 20} at T1 and an already existing changeset given by: {ObjectA.arrField, prior_size: 2, pos: 1, payload: 53} at T2. Since the first changeset occurred before the second changeset, the first changeset wins preference under flexible synchronization rules that are described further herein. The cloud-tier server 710 may transform {ObjectA.arrField, prior_size: 2, pos: 1, payload: 20} to {ObjectA.arrField, prior_size: 3, pos: 1, payload: 20} and integrate it. Next, the cloud-tier server 710 may reach server version 37. At this point, the cloud-tier server 710 state for ObjectA is {_id: TestID, arrField: [1, 20, 53, 9]}.

Next, the cloud-tier server 710 may send a download to the first internal client 722 with a changeset for the server version 36. The first internal client 722 integrator may process the download message and changesets. In this case, the new changesets server version may be 10 and the client version may be 36. The session ident may be set to the first internal client 722 session ident, which is 5 in this case. The progress client version may be set to the download message's download server version, which is 36 in this case. The progress server version may be set to the download message's download client version, which is 10 in this case. May then QBSTieredCoordinator send the upload message to the mid-tier server 720.

Next, the mid-tier server 720 may receive the upload message with a progress client version of 36 and a progress server version of 10. The changeset on the message may have a client version of 36 and the server version of 10. The mid-tier server 720 may perform OT on the uploaded changeset and integrate it. In this case, since the server version on the upload is 10 and the latest server version of the mid-tier server 720 is 11, the merge window may include the changeset at version 11 for the mid-tier server 720.

In this case, the two changesets undergoing OT are an incoming changeset given by: {ObjectA.arrField, prior-_size: 2, pos: 1, payload: 53} at T2 and an already existing changeset given by {ObjectA.arrField, prior_size: 2, pos: 1, payload: 20} at T1. Since the second changeset occurred before the first changeset, the first changeset wins preference under flexible synchronization rules. The cloud-tier server 710 may transform {ObjectA.arrField, prior_size: 2, pos: 1, payload: 53} to {ObjectA.arrField, prior_size: 3, pos: 2, payload: 53} and integrate it. Next, the mid-tier server 720 may reach server version 12. At this point, the mid-tier server 720 state for ObjectA is {_id: TestID, arrField: [1, 20, 53, 9]}.

Example Tiered Synchronization Methods

Figure 4:
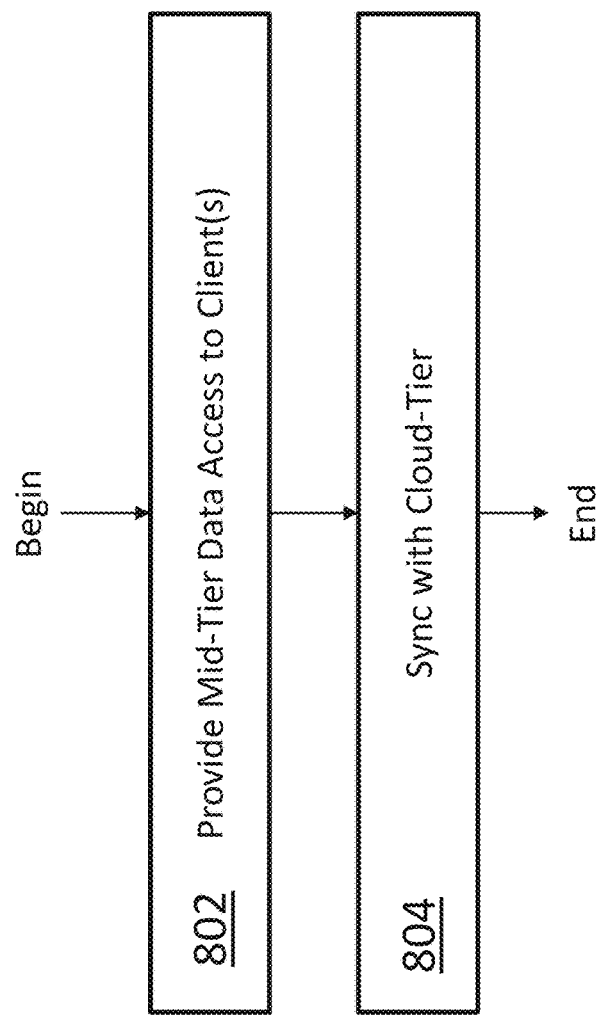
FIG. 4 is a flow diagram of a first example method of tiered synchronization, according to some embodiments.

FIG. 4 is a flow diagram of an example method 800 of tiered synchronization, according to some embodiments. As shown in FIG. 4, method 800 includes step 802 of providing access, to one or more clients to mid-tier data and step 804 of synchronizing data with a cloud-tier server.

In some embodiments, method 800 may be performed using a tiered synchronization system (e.g., 300 in FIG. 2), such as at least in part, by a mid-tier server (e.g., 320 in FIG. 2). For example, the mid-tier server may provide access to the client(s) (e.g., 304) to the mid-tier data over a local network (e.g., LAN), and the mid-tier server may synchronize the data with the cloud-tier server (e.g., 310) over a remote network connection (e.g., the Internet). For instance, the mid-tier data may be stored in a non-relational portion of a mid-tier database (e.g., 322) and may correspond to a subset of cloud-tier data stored in a non-relational portion of a cloud-tier database (e.g., 312), such as described herein including in connection with FIG. 2.

In some embodiments, method 800 may further include (e.g., by the mid-tier server, e.g., 320) synchronizing the mid-tier data with the cloud-tier data when the mid-tier data is modified by the client(s) and the mid-tier server detects the modification over the local network, such as described herein including in connection with FIG. 2. In some embodiments, method 800 may alternatively or additionally include (e.g., by the mid-tier server) synchronizing the mid-tier data with the cloud-tier data when the mid-tier data is modified at the cloud-tier server, and the mid-tier server detects the modification over the Internet, such as described herein including in connection with FIG. 2.

In some embodiments, method 800 may further include (e.g., by the mid-tier server) requesting, from the cloud-tier database (e.g., 312), access to data stored in the non-relational portion of the cloud-tier database that is not stored in the non-relational portion of the mid-tier database (e.g., 322), such as described herein including in connection with FIG. 2. For example, requesting access to data stored in the cloud-tier database may be a part of and/or in addition to synchronizing at step 804.

In some embodiments, method 800 may further include (e.g., by the mid-tier server), while the mid-tier server is disconnected from the cloud-tier server, updating the mid-tier data when modified by a first client and providing updated mid-tier data to a second client, such as described herein including in connection with FIG. 2. For example, updating mid-tier data and providing updated mid-tier data to clients may include and/or form a part of step 802 of providing mid-tier data access to clients.

In some embodiments, method 800 may further include (e.g., by the mid-tier server), when the mid-tier server is reconnected to the cloud-tier server after being disconnected from the cloud-tier server, updating the subset of cloud-tier data based on the updated mid-tier data, such as described herein including in connection with FIG. 2. For example, updating the subset of cloud-tier data based on updated mid-tier data may include and/or form a part of step 804 of synchronizing with the cloud-tier server.

In some embodiments, method 800 may further include (e.g., by the mid-tier server), acting as a client of the cloud-tier server over the Internet and acting as a server for the client(s) over the local network, such as described herein including in connection with FIG. 2. For example, acting as a server for the client(s) may include and/or form a part of step 802 of providing mid-tier data access to the client(s), and/or acting as a client of the cloud-tier server may include and/or form a part of step 804 of synchronizing with the cloud-tier server.

In some embodiments, method 800 may further include (e.g., by the mid-tier server) periodically checking an Internet connection. For example, step 804 of synchronizing data with the cloud-tier server over the Internet may be in response to detecting that the mid-tier server is connected to the cloud-tier server over the Internet, such as described herein including in connection with FIG. 2.

Figure 5:
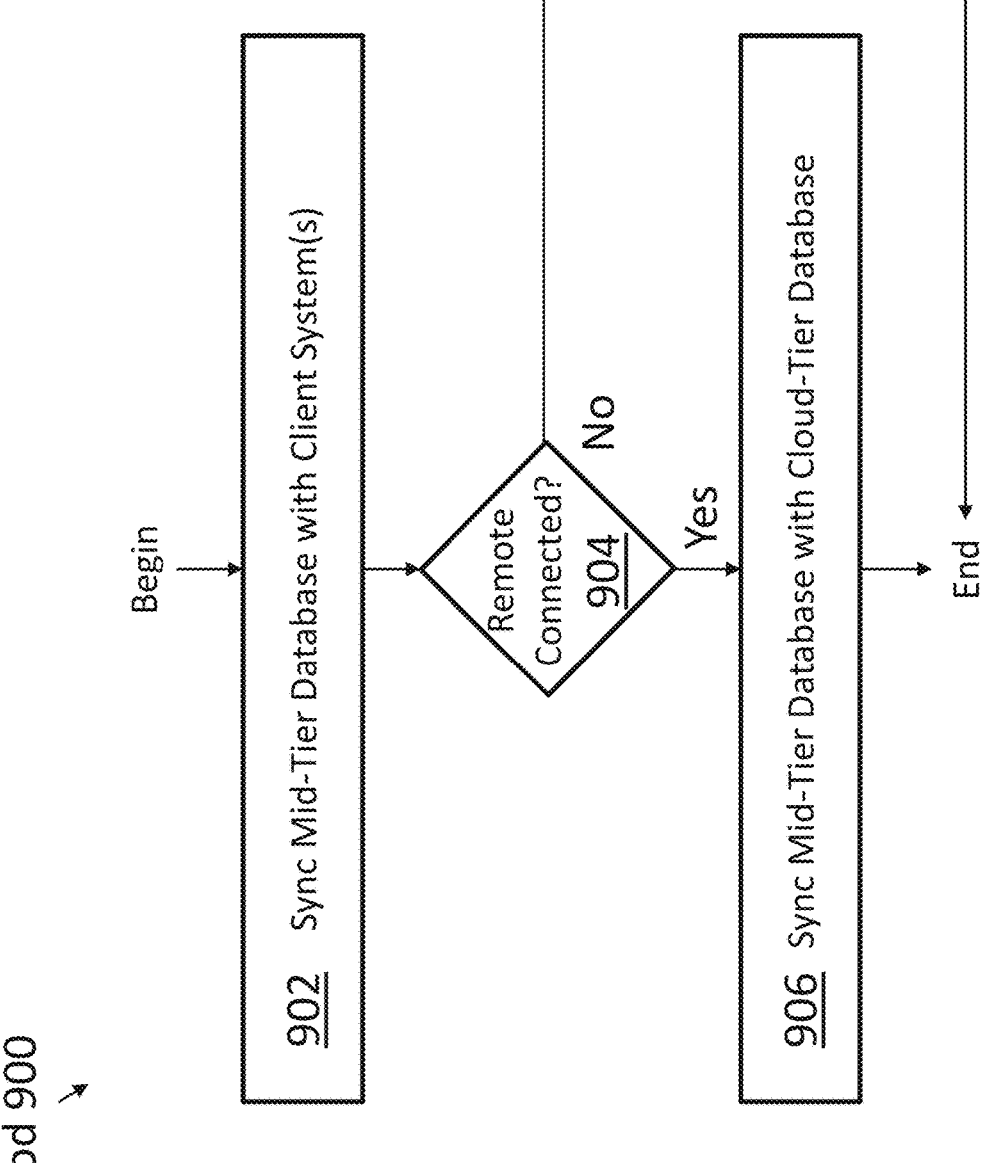
FIG. 5 is a flow diagram of a second example method of tiered synchronization, according to some embodiments.

FIG. 5 is a flow diagram of an example method 900 of tiered synchronization, according to some embodiments. As shown in FIG. 5, method 900 includes step 902 of synchronizing a mid-tier server database with client systems, and a remote network connection is available, step 906 of synchronizing the mid-tier server database with a cloud-tier server database.

In some embodiments, method 900 may be performed using a tiered synchronization system (e.g., 300 in FIG. 2), such as at least in part by a mid-tier server (e.g., 320 in FIG. 2). For example, at step 902, the mid-tier server may synchronize a mid-tier server database (e.g., 322 in FIG. 2) with data interactions between the mid-tier server and local clients (e.g., 304) over a local network connection (e.g., LAN). For instance, synchronizing the mid-tier server database with the data interactions between the client systems (e.g., 304) and the mid-tier server (e.g., 320) may be independent of the remote network connection, such as described herein including in connection with FIG. 2.

In some embodiments, the mid-tier server database and/or the cloud-tier server database may be non-relational, such as by including at least a non-relational portion storing data targeted in data interactions between the client systems and the mid-tier server that the mid-tier server synchronizes at step 902.

In some embodiments, step 904 shown in FIG. 5 may include an act of determining whether the remote connection is available. For example, step 904 may include (e.g., by the mid-tier server) determining whether the mid-tier server is connected to the cloud-tier server database (e.g., via the cloud-tier server) over the Internet. In some embodiments, step 904 may include (e.g., by the mid-tier server) periodically checking the remote network connection. For instance, synchronizing the mid-tier server database with the cloud-tier server database at step 906 may be in response to detecting that the mid-tier server is connected to the cloud-tier server database over the remote network connection. In some embodiments, when the remote connection is not available, step 906 may not be performed (e.g., at least at that time).

In some embodiments, method 900 may further include (e.g., by the mid-tier server), independent of the remote network connection, acting as a server to client systems connected to the mid-tier server over the local network connection, such as described herein including in connection with FIG. 2. For example, acting as a server may include and/or form a part of synchronizing the mid-tier server database with client system(s) at step 902.

In some embodiments, method 900 may further include (e.g., by the mid-tier server) acting as a client to a cloud-tier server coupled to the cloud-tier server database when the mid-tier server is connected to the cloud-tier server over the remote network connection, such as described herein including in connection with FIG. 2. For example, acting as a client to the cloud-tier server may include and/or form a part of synchronizing the mid-tier server database with the cloud-tier server database at step 906.

In some embodiments, method 900 may further include (e.g., by the mid-tier server), independent of the remote network connection, responding to requests for access to data stored in the mid-tier server database, the requests received from client systems over the local network connection, such as described herein including in connection with FIG. 2. For example, the requests for access to data may include and/or form a part of data interactions with client systems that are synchronized at step 902.

In some embodiments, method 900 may further include (e.g., by the mid-tier server), when connected to the cloud-tier server database over the remote network connection at step 904, requesting access to data stored in the cloud-tier server database in response to requests for access to data not stored in the mid-tier server database, the requests received from client systems over the local network connection, such as described herein including in connection with FIG. 2. For example, the request(s) for access to data stored in the cloud-tier server may be performed in addition to synchronization at step 906.

Flexible Synchronization Techniques

Figure 6:
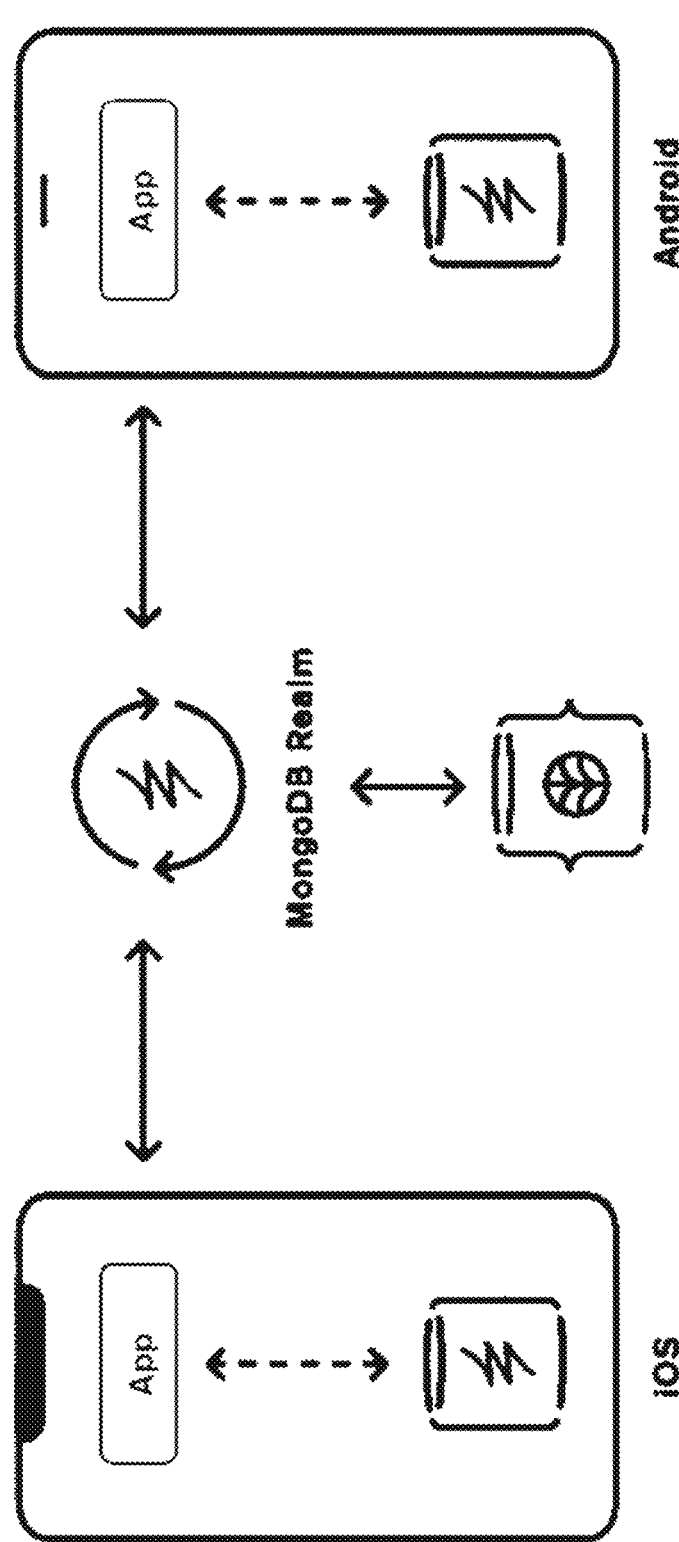
FIG. 6 is a diagram of an example system with multiple smartphones, according to some embodiments.
Figure 7:
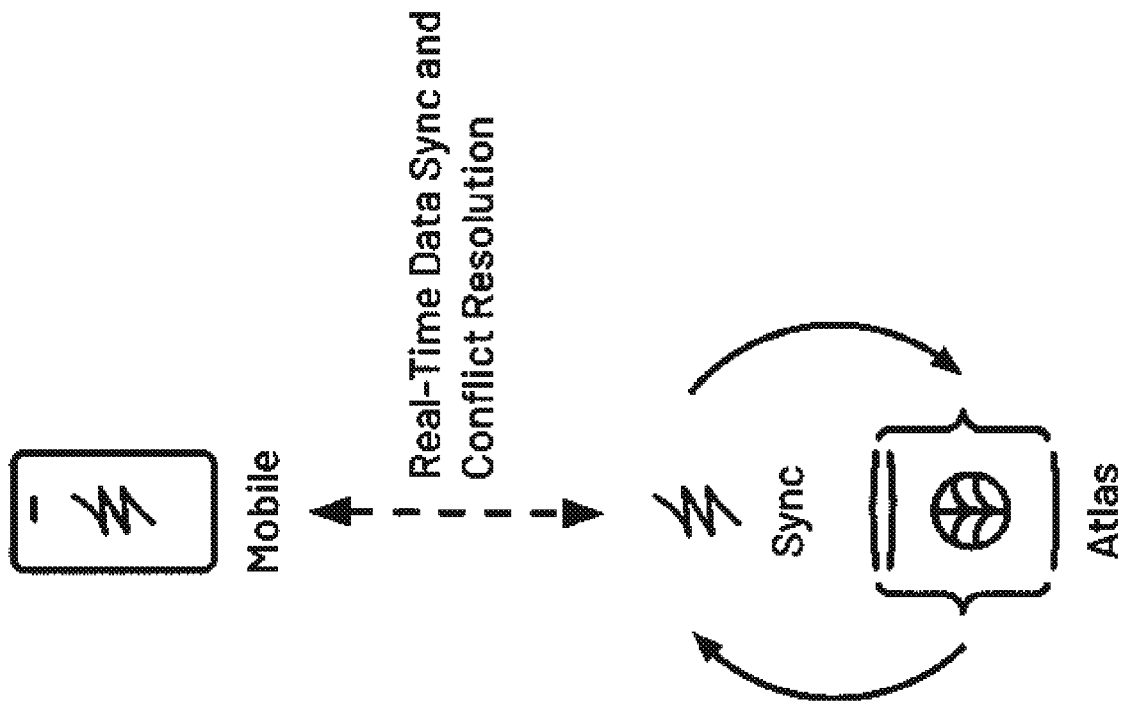
FIG. 7 is a diagram of an example system showing data sync and conflict resolution, according to some embodiments.

FIG. 6 is a diagram of an example system with multiple smartphones, according to some embodiments. FIG. 7 is a diagram of an example system showing data sync and conflict resolution, according to some embodiments.

The inventors have recognized that synchronization interactions more applicable to modern applications and user needs may be provided by making them "flexible" across 3 key domains: data, permissions, and schema. For data, some embodiments may define the subset of data synchronized via a query and dynamically update this within an application at any point in time while keeping data transfer efficient. For permissions, some embodiments may have field-level permissions that bind on session start and can be dynamically decided per session. For schema, some embodiments may provide data validation to be dictated at the field level and updated at any point, with provisions for handling invalid data at the client level.

Some conventional systems let app developers build reliable, offline-first mobile apps that serve data to millions of end users. The inventors have recognized that conventional systems have worked well for apps where data is compartmentalized and permissions rarely change, but dynamic use cases with evolving permissions required workarounds.

The inventors have recognized that even the most complex use cases can be enabled out-of-the-box without requiring any custom code. For example, custom code is on network retry API logic. Such code can make something feel real-time/event-driven even if it is not.

The inventors have recognized that it may be advantageous for all devices to have some subset of data from a backend store, but with no restrictions as to what that subset is (outside what is permitted by read/write permissions).

In some embodiments, evolving permissions may be possible. For example, with a school database including students, teachers, principals, each has different levels of access. Students can read their data, maybe with some write access; teachers can read their data and write to some data; principals can access almost everything, both read and often write.

Figure 10:
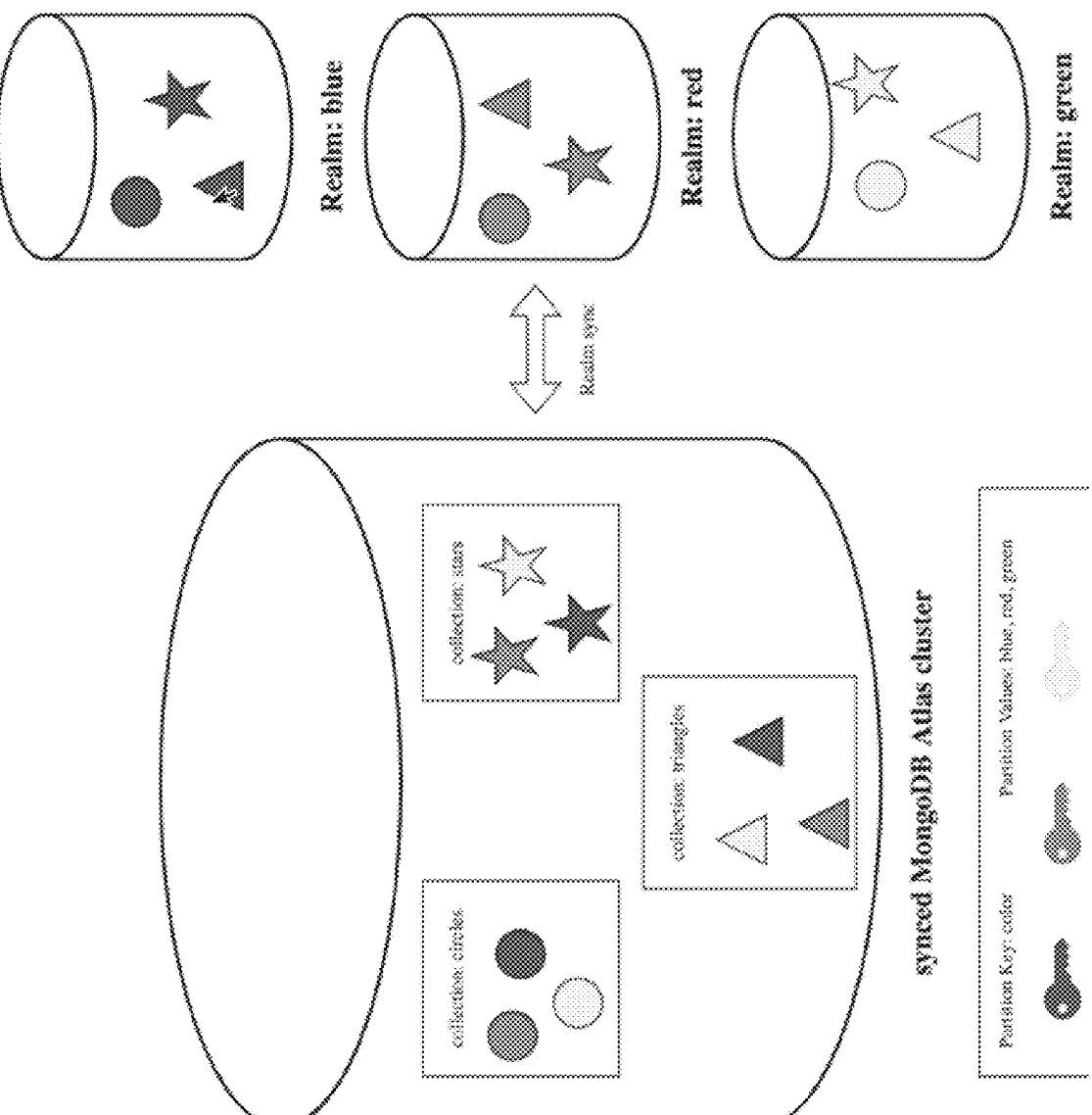
FIG. 10 is a block diagram of exemplary partitioned data access, according to some embodiments.
Figure 11:
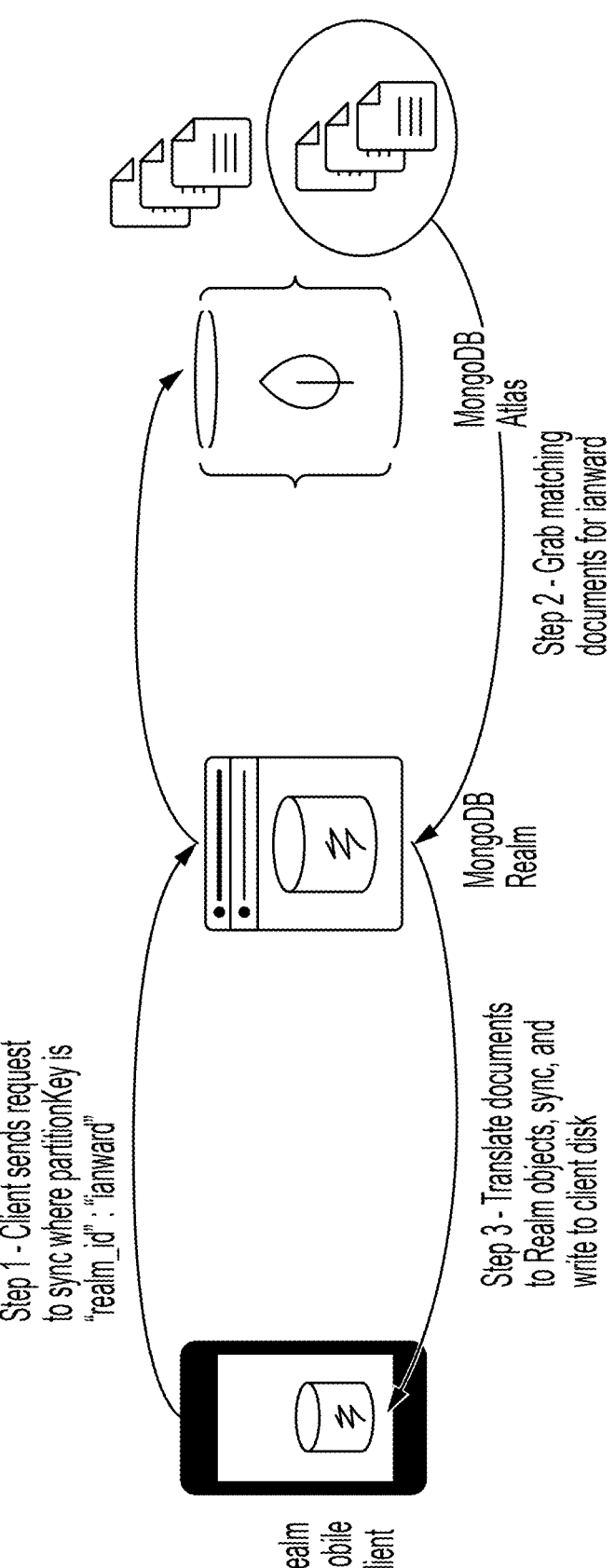
FIG. 11 is a diagram of exemplary partitioned data access with exemplary processes, according to some embodiments.
Figure 12:
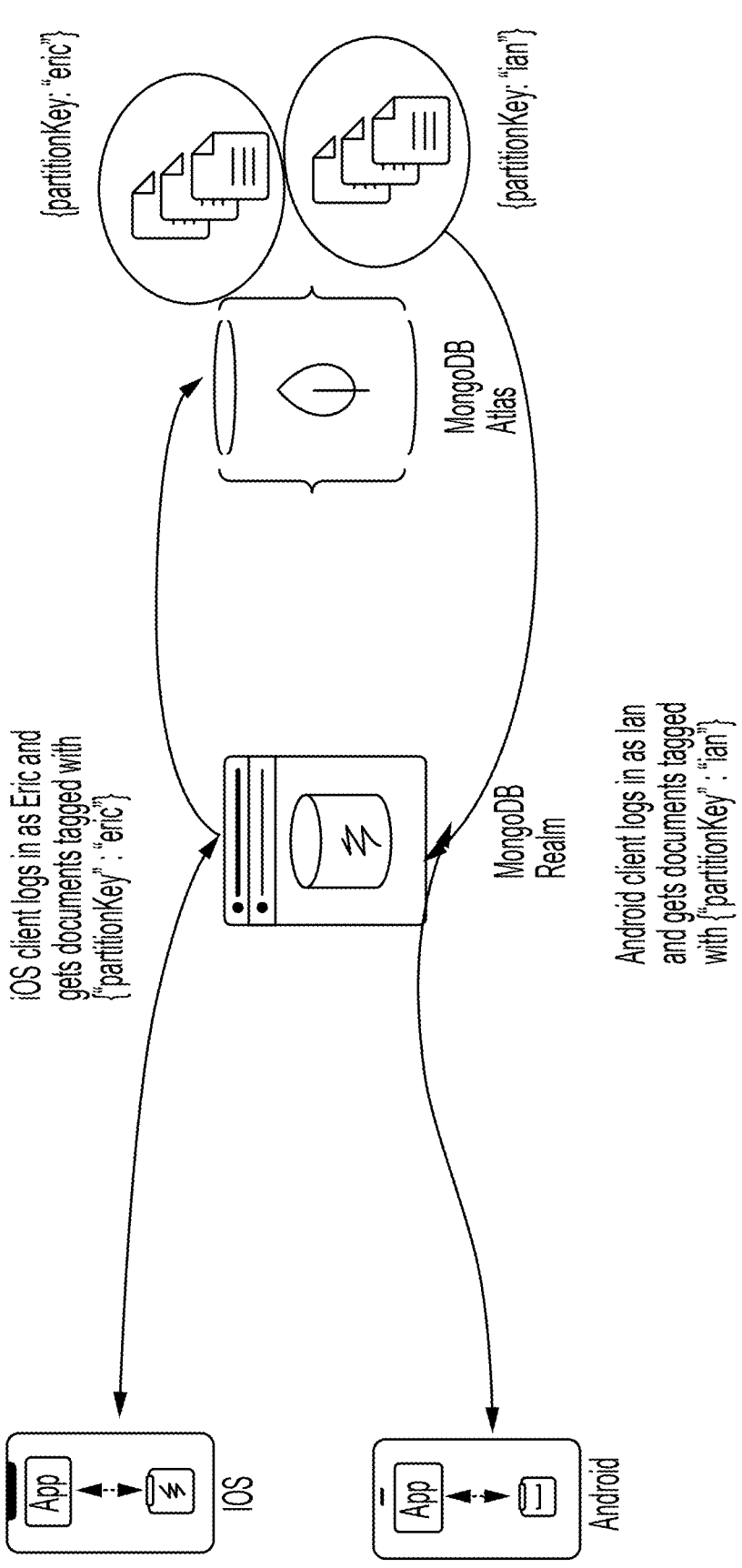
FIG. 12 is a diagram of exemplary partitioned data access with additional exemplary processes, according to some embodiments.
Figure 13:
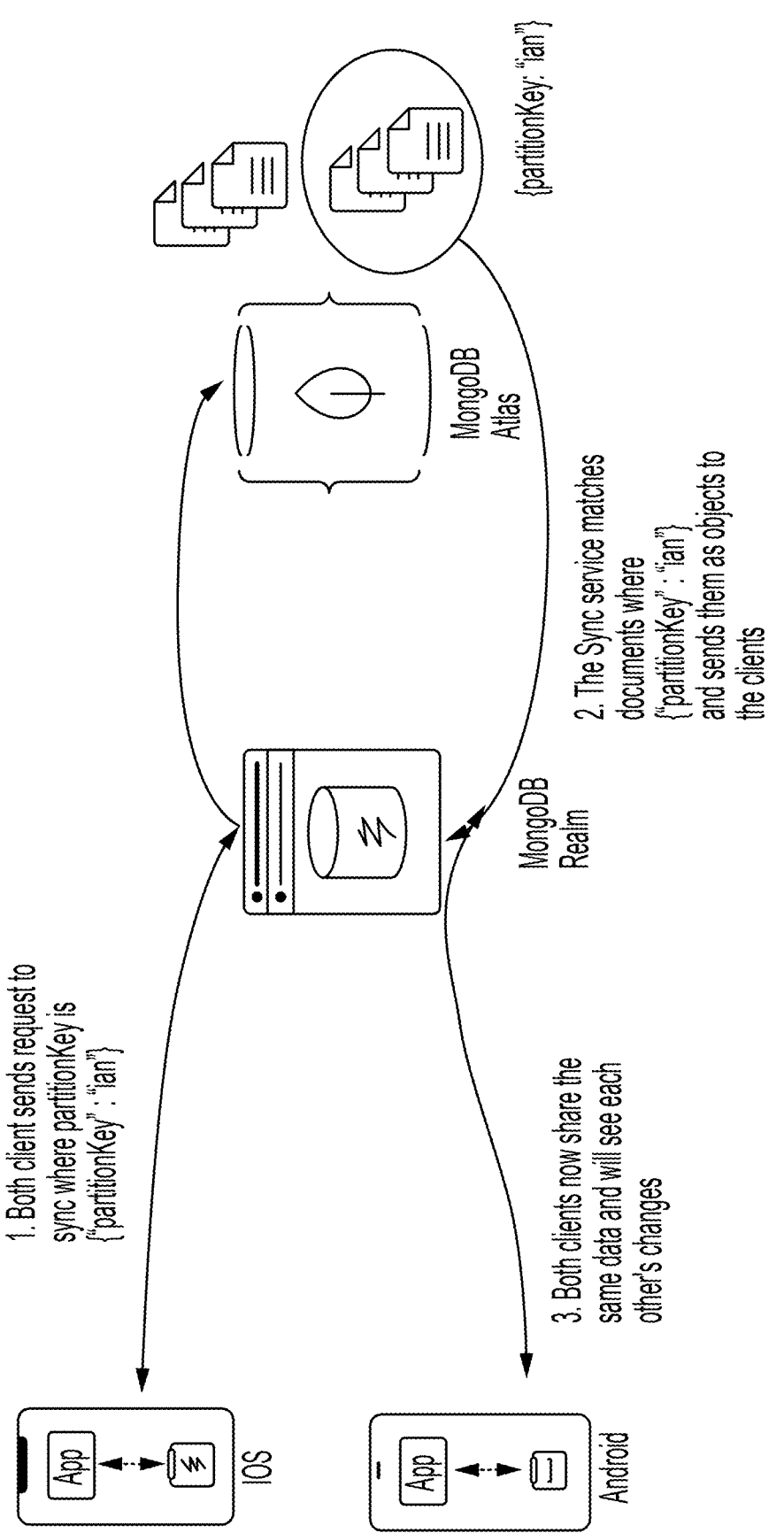
FIG. 13 is a diagram of exemplary partitioned data access with more exemplary processes, according to some embodiments.

Conventionally, data would need to be split into chunks and defined at that level; data had to live in separate partitions. FIG. 10 shows an example of partitioned data access. FIGS. 11-13 show examples of processes used with partitioned data access.

In some embodiments, partitions may be avoided. Conventionally, a static partition was able to be opened with a query. However, a business often evolves in ways that require changes to such partitions. Some embodiments herein allow splitting up data dynamically, which helps avoid the limitations of partitions.

For example, FIG. 8 is a diagram of an example system with further exemplary processes, according to some embodiments. FIG. 9 is a diagram of an example system with more exemplary processes, according to some embodiments. FIGS. 8 and 9 show how changes may be propagated from client to server and server to client.

In some embodiments, a first changeset may be generated at a first client device. In some embodiments, the first changeset may be representative of an operation on a data object in a database. In the context of a tiered synchronization system, the data object may be in a mid-tier server database of a mid-tier server to which the client device communicates over a local network connection, and/or the data object may be in a cloud-tier server database of a cloud-tier server to which a mid-tier server communicates over a remote network connection.

In some embodiments, a synchronization request may be transmitted from the first client device and to one or more servers. For example, the synchronization request may be for synchronizing the database with one or more changesets generated by a second client device. In the context of a tiered synchronization system, a local client system may transmit a synchronization request to a mid-tier server, and/or a mid-tier server may transmit a synchronization request to a cloud-tier server.

In some embodiments, in response to the synchronization request, a second changeset may be received at the first client device and from the one or more servers. For example, the second changeset may be representative of an operation performed by the second client device on the data object. In some embodiments, the database may be shared between the first client device and the second client device. In the context of a tiered synchronization system, a mid-tier server may transmit the second changeset to the first client device reflecting an operation performed by another client device that is in communication with the mid-tier server over the local network connection, and/or the mid-tier server may receive the second changeset from a cloud-tier server as a client device thereof, the operation may be performed by another client of the cloud-tier server.

In some embodiments, at the first client device, the first changeset and the second changeset may be merged to update the data object. In some embodiments, such merging may be performed based on data received from the server(s) (for example, more than one of the servers), which may be operating in parallel to each other. For example, merging may take place at a client of the mid-tier server, and/or may take place at the mid-tier server in the case where the mid-tier server received the second changeset from the cloud-tier server.

The inventors have recognized that permissions are required in almost every app. Some embodiments apply a document-level permission model when synchronizing data, meaning synced documents can be limited based on a user's role. Some embodiments apply field-level permission. For example, a document or object has many attributes/fields. In an example of data describing pants, pants may have fields for a number of pockets, color, material, etc., as well as fields a consumer would not see but someone taking inventory in the store should be able to sec.

Another example is an emergency room team, which may use their hospital's application. A resident should only be able to access their patients' charts while their fellow needs to be able to see the entire care team's charts. In some embodiments, a user's role will be combined with the client-side query to determine the appropriate result set. For example, when the resident above filters to view all patient charts, the permission system will automatically limit the results to only their patients.

In some embodiments, permissions are defined in relation to the user and the query and the data being accessed. For example, a user could request data from various data at once via a single query. In a catalog example, a user can search across multiple stores/tables with one query, and with this system, the data passes through permissions analysis based on a query and the results and the user.

In some embodiments, all processing with distributed set of clients making requests can be distributed across multiple servers. In some embodiments, those servers may be interacting with a database instance that is also distributed. For example, some embodiments may employ a "server-less" model of distributing the synchronization logic. In some embodiments, this may include a tiered synchronization system having a mid-tier server and a cloud-tier server.

Some embodiments enhance query performance and optimize for real-time collaboration by treating a single object or document as the smallest entity for synchronization. For example, synchronized data may be shared between client devices more efficiently. This may come from dynamic updating where when a user updates the query, not everything is pulled. Rather, the system identifies net changes for adding or removing from the query via differentials, and when the data updates, only the new fields will be sent (or even just incrementing a value as needed).

In some embodiments, a combination of granular permissions and distributed "server-less" computing may be used. In some embodiments, these may be used with idiomatic syntax, conflict resolution (such as is described herein), and language-native queries (e.g., in a programming language, where the actual syntax varies across platforms and is adapted to the standard ways one would express queries in those platforms).

In some embodiments, data to be synchronized via a request (e.g., a request for synchronization) may be decided via a language-native query, such as one of those described above.

In some embodiments, a language-native query may be processed on one or more servers. Alternatively or additionally, a language-native query may be processed via server-less computing.

In some embodiments, a language-native query may be in a first query language of a client device and may be translated to a second query language of one or more servers. Alternatively, the second query language may be of distributed devices in a server-less computing model.

In some embodiments, permissions to access a translated query (such as the language-native query translated to the second query language described above) may be added. For example, the translated query may not be accessible without these permissions, and these permissions may be created and provided in order to grant that access, by a server, client, or distributed device.

In some embodiments, a filtered set of data may be identified for synchronization based on execution of a translated and permissioned query (such as the language-native query translated to the second query language described above). For example, after a query is translated and permissioned (such as is described above) and executed, a server, client, and/or distributed device may identify a filtered set of data for synchronization.

In some embodiments, needed data may be identified by one or more servers or a distributed device, based on at least one changeset to be processed on a client device. For example, if certain data is needed (such as by a synchronization request), the server(s) or disturbed device(s) may identify that data using one or more changesets that may be processed on a client device.

The inventors have recognized that providing some of the functionality described herein at scale (e.g., with millions of users and tens of thousands of concurrent users interacting with the data at once) is difficult because it is so complex at a server level. For example, doing dynamic updating of queries is difficult and there are many pathological cases where a lot of data or compute power is used, making it very hard to run use cases. The inventors have recognized this can be achieved at scale using distributed conflict resolution, where more hosts working in parallel are used rather than many processes working in serial.

The inventors have recognized that determining how permissions should work can be difficult, because the idea of something falling in and out of view relates to what a user can and cannot see. For example, one cannot always explicitly tell people what they are not allowed to see, because that would be exposing data. For example, if a user was changing permissions or they relied on a user based on time, etc., paying attention to all those attributes in real-time and figuring out what a user can or cannot see or edit vastly grows the complexity of computations that must take place.

The inventors have recognized that sessions (e.g., logging in to start a session) may be used to determine permissions. For example, permissions are locked based on dynamic attributes at start of the session. When a user sends a query, the logic of selecting roles across different collections has been pre-run and locked at the session level, so they may only submit the query and that is determined based on what was determined at the start of the session.

In some embodiments, permissions evolve across sessions, rather than within a single session. For example, a system can still force a sign-out during a session if someone is fired, quits, etc.

In some embodiments, metadata is stored to facilitate a request process in an internal cluster rather than a customer cluster. For example, all the customer's data and their history changes resides in their cluster.

Some embodiments may make it easier to integrate data from mobile devices to the backend (e.g., a cloud-based backend). For example, some embodiments may make data accessible both on a mobile app and back-end systems, such as for bi-directional data replication.

The inventors have recognized that in an offline-first environment, edge-to-cloud data synchronization typically requires thousands of lines of complex conflict resolution and networking code, and it may leave developers with code bloat that slows the development of new features in the long-term. Some embodiments herein simplify moving data (e.g., between a client and server(s)). The inventors have recognized that with huge amounts of boilerplate code eliminated, teams may be able to focus on the features that drive positive application reviews and satisfied users.

The inventors have recognized that embodiments herein may transform the way developers are building data synchronization into their mobile applications, and the way developers are creating workarounds for complex synchronization use cases.

Some embodiments may take into account a year's worth of user feedback on partition-based sync, and may aim to make syncing data (e.g., to server(s)) a simple and idiomatic process by using a client-defined query to define the data synced to user applications.

Some embodiments may allow developers to start writing code that synchronizes data more quickly, allowing users to choose which data is synced via a language-native query and to change the queries that define your syncing data at any time.

In some embodiments, developers can enable devices to define a query on the client side (e.g., using the Realm query-language), which will execute (e.g., on server(s)) to identify the set of data to synchronize. In some embodiments, any documents that match the query will be translated to Realm Objects and saved to the client device's local disk. In some embodiments, the query will be maintained on the server, which will check in real-time to identify if new document insertions, updates, or deletions (e.g., on server (s)) change the query results. In some embodiments, relevant changes on the server-side will be replicated down to the client in real-time, and any changes from the client will be similarly replicated to server(s).

Some embodiments are distinctly different from partition-based sync. In some embodiments, with partition-based sync, developers must configure a partition field for their database (e.g., the remote database on the server(s)). In some embodiments, this partition field lives on each document within the database that the operator wants to sync. In some embodiments, clients can then request access to different partitions of the database, using the different values of the partition key field. In some embodiments, when a client opens a synchronized Realm, they pass in the partition key value as a parameter. In some embodiments, the sync server receives the value from the client, and sends any documents down to the client that match the partition key value. In some embodiments, these documents are automatically translated as Realm Objects and stored on the client's disk for offline access.

The inventors have recognized that partition-based sync works well for applications where data is static and compartmentalized, and where permissions models rarely need to change. In some embodiments, making fine-grained and flexible permissioning is possible, as is opening up new application use cases through simplifying the syncing of data that requires ranged or dynamic queries.

Some embodiments, unlike with partition-based sync, make it seamless to implement the document-level permission model when syncing data, meaning synced fields can be limited based on a user's role.

In some embodiments, a healthcare app may be used, with different field-level permissions for patients, doctors, and administrative staff using the application. In some embodiments, a patient collection contains user data about the patient, their health history, procedures undergone, and prognosis. In some embodiments, the patient accessing the app would only be able to see their full healthcare history, along with their own personal information. Meanwhile, in some embodiments, a doctor using the app would be able to see any patients assigned to their care, along with healthcare history and prognosis. In some embodiments, doctors viewing patient data would be unable to view certain personal identifying information, like social security numbers. In some embodiments, administrative staff who handle billing would have another set of field-level permissions, seeing only the data required to successfully bill the patient.

In some embodiments, this is made possible when the query sent by the client is run and a result set is obtained, and then any data from the result set sent down to the client based on the permissions is subtracted. In some embodiments, the server guards against clients receiving data the clients are not allowed to see, and developers can trust that the server will enforce compliance, even if a query is written with mistakes. Some embodiments simplify sharing subsets of data across groups of users and make it easier for an application's permissions to mirror complex organizations and business requirements.

Some embodiments also allow clients to share some documents but not others, based on the ResultSet of their query. In some embodiments, a company may have teams that typically share all the data within their respective teams, but not across teams. When a new project requires teams to collaborate, some embodiments make this easy. For example, the shared project documents could have a field called allowedTeams: [marketing, sales]. In some embodiments, each member of the team would have a client-side query, searching for all documents on allowedTeams matching marketing or sales using an $in operator, depending on what team that user was a member of.

A primary benefit is that some embodiments allow for simple synchronization of data that falls into a range (such as a time window) and automatically adds and removes documents as they fall in and out of range.

In some embodiments, an app may be used by a company's workforce, where the users only want to see the last seven days of work orders. In some embodiments, with partition-based sync, a time-based trigger may need to fire daily to move work orders in and out of the relevant partition. In some embodiments, a developer can write a ranged query that automatically includes and removes data as time passes and the 7-day window changes. The inventors have recognized that by adding a time based range component to the query, code is streamlined. In some embodiments, the sync ResultSet gets a built-in TTL, which previously had to be implemented by the operator on the server-side.

The inventors have recognized that some embodiments may satisfy desires to eliminate every possible piece of boilerplate code for developers. Some embodiments may deliver a sync service that can fit any use case or schema design pattern one can imagine, so that a user can spend their time building features rather than implementing work-arounds.

The inventors have recognized the benefits of adding very granular control of what is pushed and added, as well as dynamic control of this. For example, some embodiments support dynamic, overlapping queries based on user inputs. As an example of dynamic queries (with changing filters), a user starts looking at a catalog on their mobile phone, then narrows to pants and shirts, and then narrows to pants and shirts that are black. Some embodiments change what is synchronized with the mobile app on the fly. In some embodiments, in the same application, employees can quickly limit inventory results to only their store's stock, pulling from the same set of documents as the customer, without worrying about overlap.

The school example above is an example of overlapping queries.

In some embodiments, synchronization is in real-time, where the user selects via query what is synchronized between two systems. In some embodiments, both ends may be both readable and writable (e.g., via distributed conflict resolution). In contrast with a conventional call and response system, where systems pass events between each other as they happen, some embodiments can do everything "offline."

In some embodiments, events may be passed between the two systems, which may build from distributed conflict resolution to make more dynamic and easier to choose subsets of data, with granular permissions.

In some embodiments, steady-state routing may be used. For example, a query may be used with things being dynamically part of that query. In a catalog example, if capris were added to a catalog and defined as being a type of pants then all users who were syncing "pants" would start syncing capris automatically. If a child is updated to different class, that child would not appear in a query for that class, and any existing applications that were syncing data for that class would see the child removed.

Exemplary Features

Figure 14:
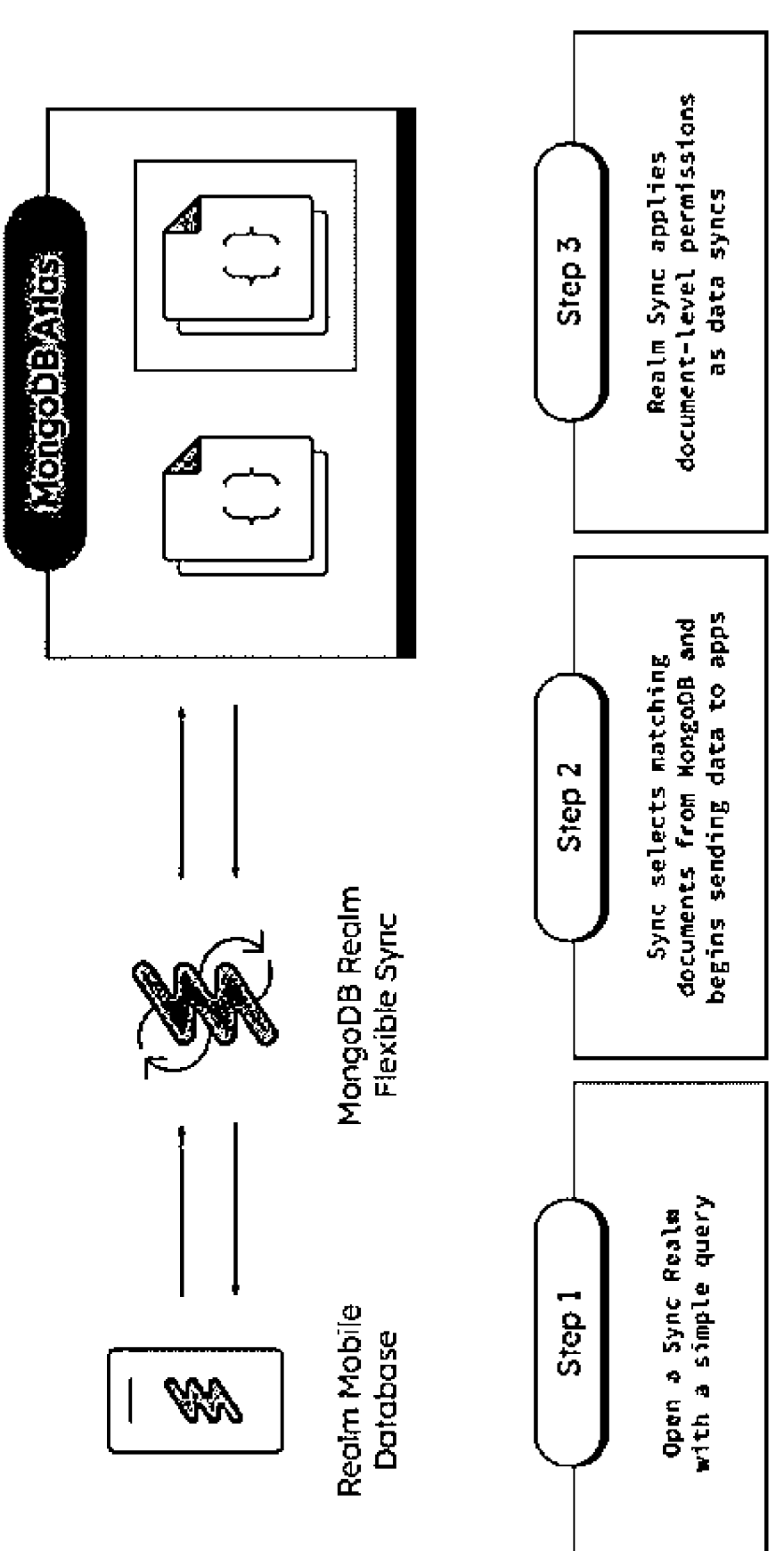
FIG. 14 is a diagram of an exemplary process for a simple query, according to some embodiments.

In some embodiments, fast, efficient edge-to-cloud sync may be possible. For example, a user may sync only the data they need, every time. In some embodiments, an exemplary process (such as shown in FIG. 14) may include a first stage in which a simple query may be used to open a sync realm. In some embodiments, the exemplary process may include a second stage in which matching documents may be selected from MongoDB and data may be sent to applications. In some embodiments, the exemplary process may include a third stage in which document-level permissions may be applied as data syncs. In some embodiments, the exemplary process may end or repeat as desired.

Figure 15:
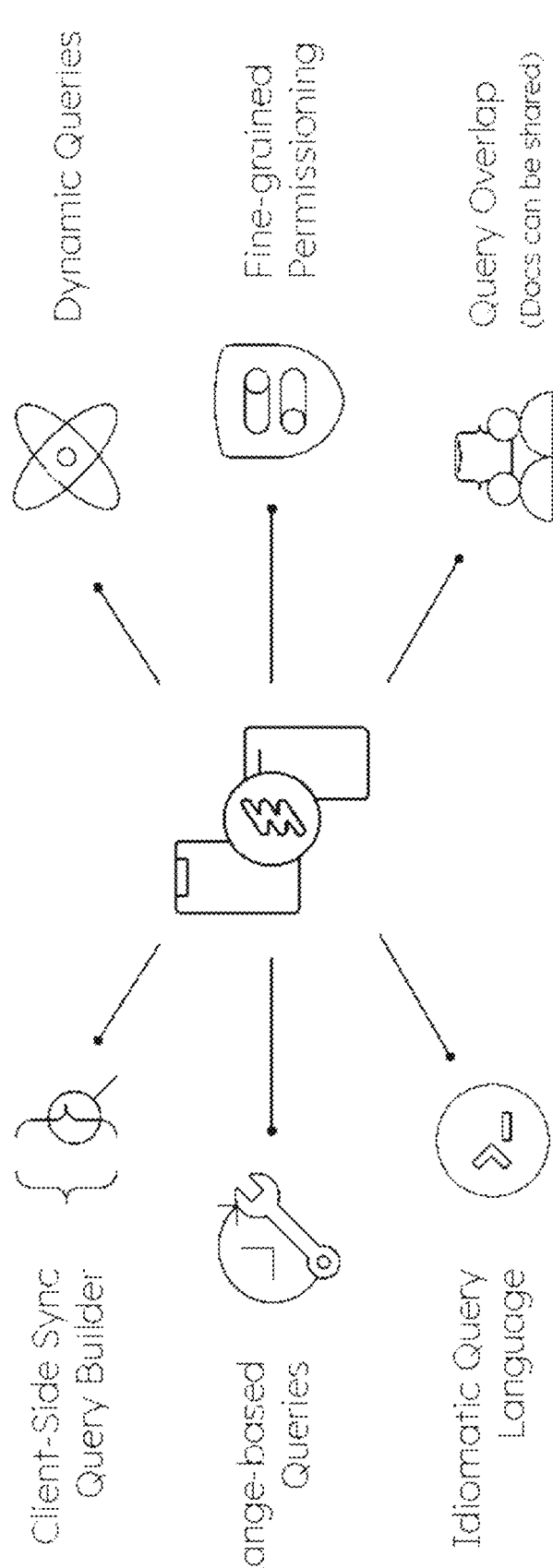
FIG. 15 is a diagram of exemplary features that assist edge-to-cloud synchronization, according to some embodiments.

In some embodiments, building edge-to-cloud synchronization may be made easier and faster than conventionally was the case. In some embodiments, this may be possible at least in part due to features shown in FIG. 15, such as Client-Side Sync Query Builder, Range-based Queries, Idiomatic Query Language, Dynamic Queries, Fine-grained Permissioning, and/or Query Overlap (e.g., documents can be shared).

Some embodiments may enable mobile developers to build edge-to-cloud synchronization in an idiomatic manner. For example, queries may be used. Some embodiments may provide fine-grained permissioning, which meets rigorous security requirements. Some embodiments may define complex sync logic using dynamic and range-based queries. For example, no custom code may be necessary.

In some embodiments, an edge-to-cloud data synchronization service may be provided. In some embodiments, such a service may help customers build reliable, offline-first mobile applications that serve data to millions of end users (e.g., from leading telematics providers to chart-topping consumer apps).

The inventors have recognized and appreciated that historically, such a service may have worked well for applications where data is compartmentalized and permissions rarely change, but that dynamic use cases with evolving permissions required workarounds. The inventors have recognized and appreciated usability can be extended using some embodiments herein. Some embodiments may enable even the most complex use cases out-of-the-box without requiring any custom code.

Some embodiments (e.g., query-based) can enable a user to send a query from their device using a set of queryable fields.

Some embodiments can allow language-native queries to define the data synced to user applications. For example, this more closely mirrors how users are used to building applications today (such as using GET requests with query parameters) making it easy to learn and fast to build.

Figure 16:
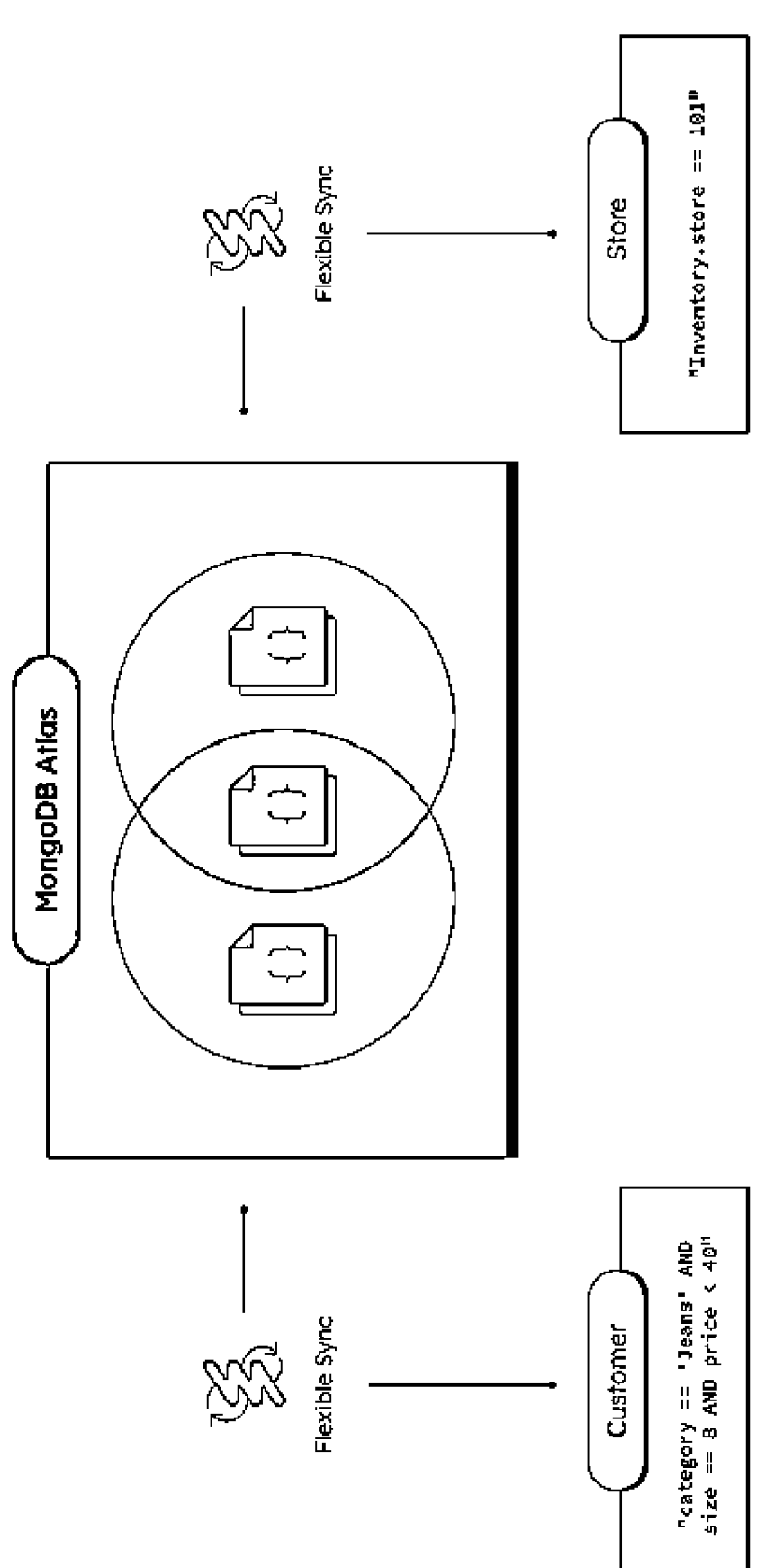
FIG. 16 is a diagram of exemplary inputs being used, according to some embodiments.

Some embodiments may support dynamic, overlapping queries based on user inputs, as described above. For example, a retail application may allow users to search available inventory where users define inputs (e.g., show all jeans that are size 8 and less than $40), and the query parameters can be combined with logical ANDs and ORs to produce increasingly complex queries and narrow down the search result even further. In some embodiments, all of such query results may be combined into a single realm file on the client's device, which significantly simplifies code required on the client-side. FIG. 16 shows an example of such inputs being used according to some embodiments.

Exemplary Architecture and Designs

Figure 17:
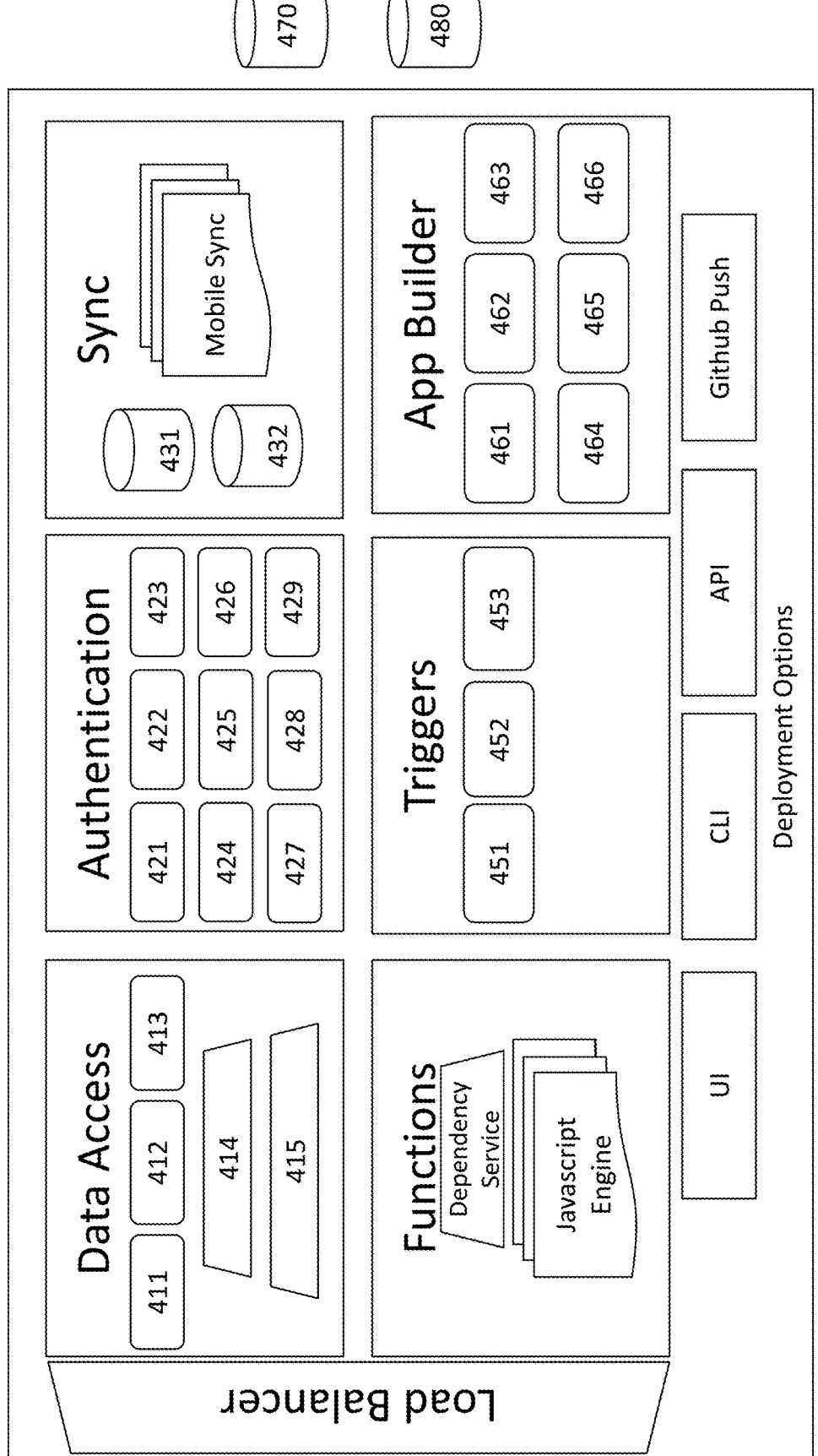
FIG. 17 is a diagram of an exemplary architecture, according to some embodiments.

FIG. 17 shows an exemplary architecture, according to some embodiments. The architecture may include logic for load balancer, data access, authentication, sync, functions, triggers, and app builder, as well as deployment options including user interface (UI), command line interface (CLI), application programming interface (API), and Github Push. In some embodiments, the data access logic may include GraphQL 411, Query Anywhere 412, Data API 413, Schema Engine 414, and Rules/Permissions Engine 415. In some embodiments, the authentication logic may include Anonymous 421, API Key 422, Google 423, Email Password 424, JWT 425, Facebook 426, Anonymous 427 (which may be different from or the same as Anonymous 421), Function Based 428, and Apple 429. In some embodiments, the sync logic may include local realm 431, local realm 432 (which may be different from or the same as local realm 431), and at least one mobile synchronization.

In some embodiments, the functions logic may include a dependency service and at least one JavaScript engine. In some embodiments, the triggers logic may include Database 451 (which may react to changes in MongoDB), Authorization 452 (which may react to authentication events), and Scheduled 453 (which may run a function at specified intervals (CRON)). In some embodiments, the app builder logic may include Static Hosting 461, Logging 462, Alerting

463, Connection Pooling 464, HTTPS Endpoints 465, and Alerting 466 (which may be different from or the same as Alerting 463).

Figure 18:
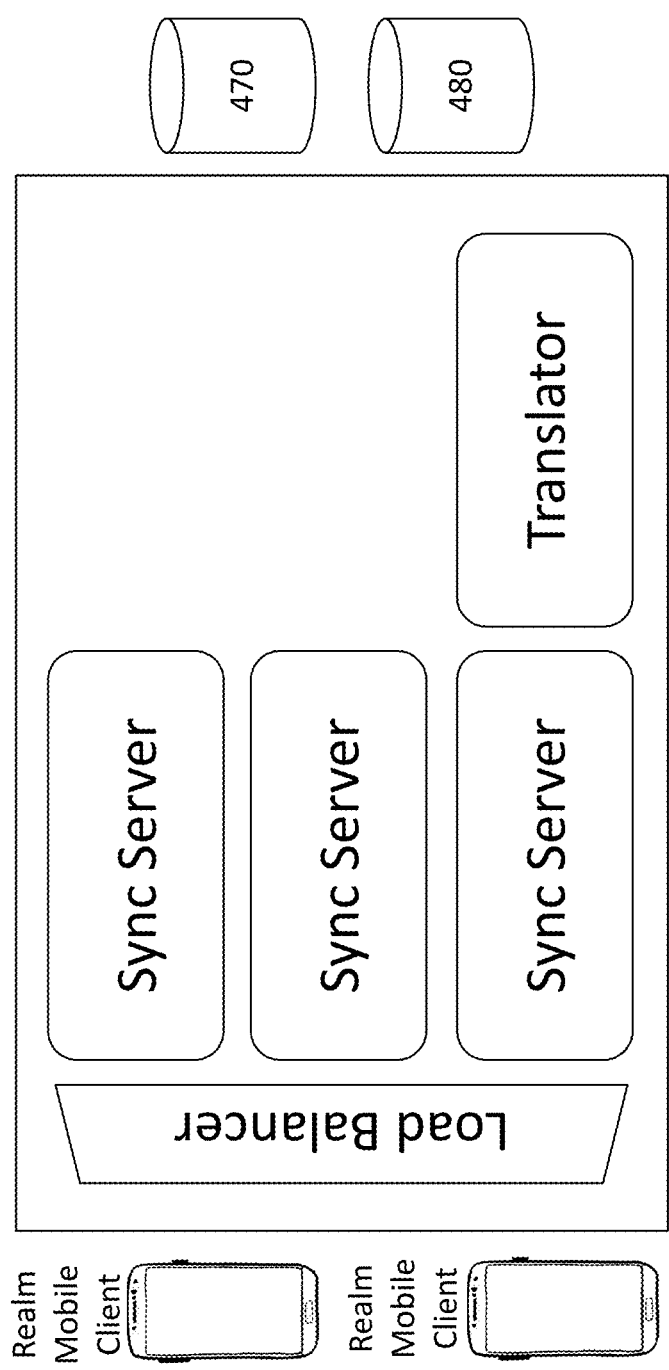
FIG. 18 is a diagram of an additional exemplary architecture, according to some embodiments.

FIG. 18 shows an additional exemplary architecture, according to some embodiments. The architecture may include a plurality of realm mobile clients, a load balancer, a plurality of sync servers, a translator, and a realm cluster 470 and a customer cluster 480. In some embodiments, the sync servers may handle connection to devices. In some embodiments, the sync servers may parse, validate, and integrate uploaded changes. In some embodiments, the sync servers may notify devices of new changes. In some embodiments, the sync servers may perform conflict resolution. In some embodiments, the translator may apply mobile writes to MongoDB. In some embodiments, the translator may listen to changes made to MongoDB and insert them into Realm. In some embodiments, the translator may perform Multimaster replication between Realm and MongoDB. In some embodiments, one server in the cluster may be responsible for at least one of these functions of the translator. In some embodiments, the realm cluster 470 may include app information, schema, permissions, and logs. In some embodiments, the customer cluster 480 may include data and sync metadata.

Figure 19:
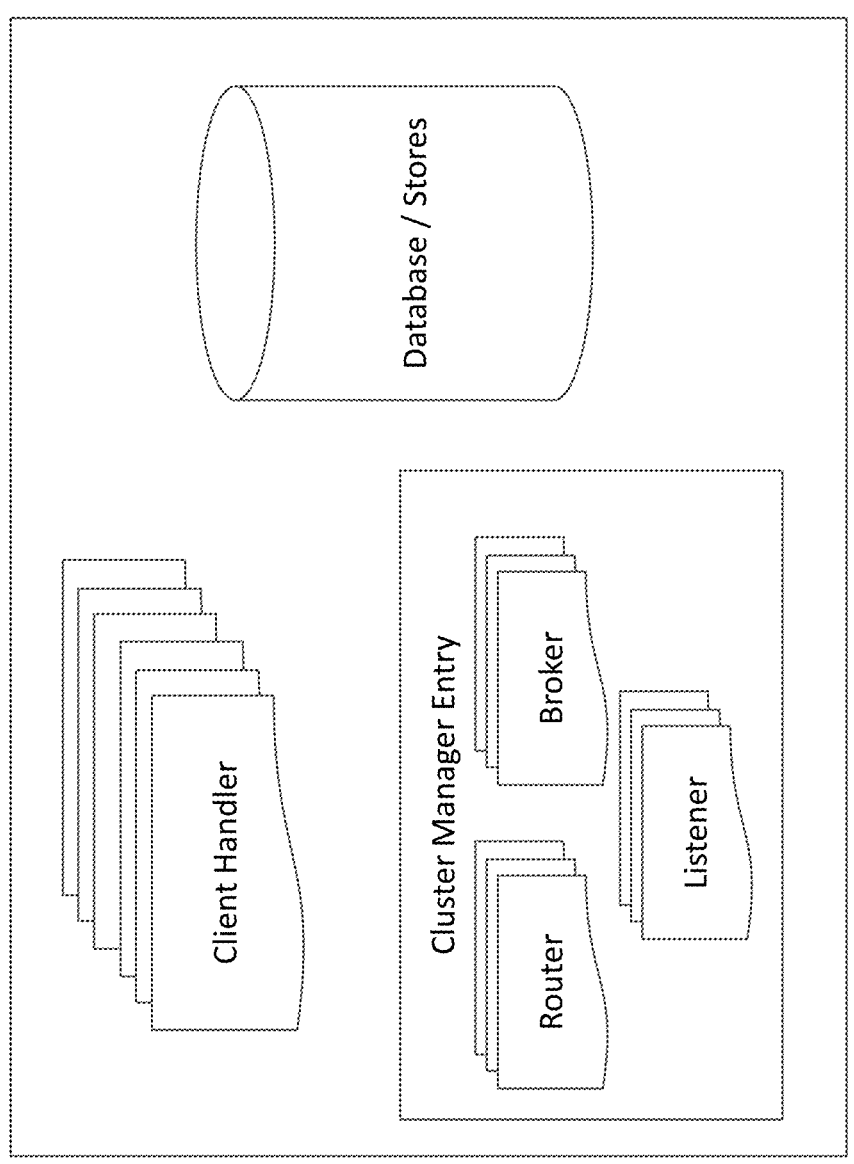
FIG. 19 is a diagram of exemplary bootstrapping architecture, according to some embodiments.

In some embodiments, bootstrapping may be used. For example, bootstrapping is when the client is either connecting for the first time or changing its query. In some embodiments, a "state store" may be kept in the sync metadata, which is a copy of all data that has been uploaded to sync. In some embodiments, a query may be used on all objects that were in the previous query but are no longer in the current query. For example, some embodiments may synthesize EraseObject instructions for those objects. In some embodiments, the new query may be bootstrapped to get any new objects that were previously unseen by the client. FIG. 19 shows exemplary bootstrapping architecture, according to some embodiments.

In some embodiments, uploading may be handled in the following stages: In some embodiments, uploads may be received and validated (e.g., by a ClientHandler). In some embodiments, Operational Transform may be performed against any changes in the server history that are not causally related. In some embodiments, Pre and Post images for each object in the upload may be generated. In some embodiments, the Pre/Post image may be evaluated using the write permissions to ensure write is allowed. In some embodiments, an entry may be inserted into the server history. In some embodiments, the state store documents may be updated. In some embodiments, the progress for the Client File may be updated. In some embodiments, the database transaction may then be committed.

Figure 20:
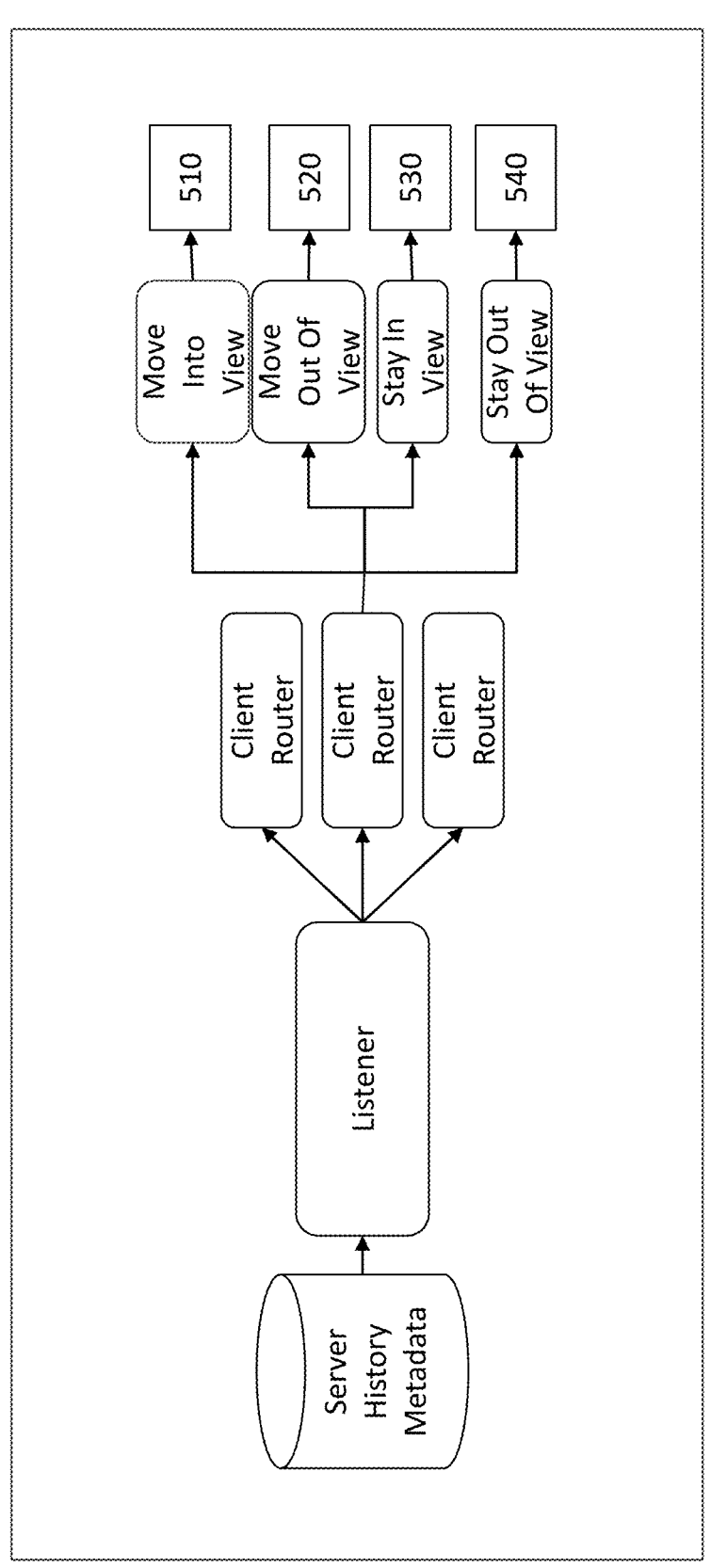
FIG. 20 is a diagram of exemplary steady-state routing architecture, according to some embodiments.

In some embodiments, steady-state routing may be used to provide an efficient way to route new history entries to clients that care about them. In some embodiments, for every entry in history, there is desire to immediately determine if the change is within view of each client's permissions and subscription. For example, an object moving into view depicts why the state store is desirable. For example, there may be a subscription on {price >100}, and bootstrap all objects where price >100. In such an example, change comes in to update {_id: 123, name: "Mac M1", price: 90} to update the price field to 110. For example, the router may only see the single update instruction {id: 123, field: "price", payload: 110}. In some embodiments, there is a need to look up the state of the object in the state store to send the full state of the object. FIG. 20 shows exemplary steady-state routing architecture, according to some embodiments. In some embodiments, the routing architecture may include server history metadata, a listener, a plurality of client routers (such as the routers described herein), and logic 510, 520, 530, and 540. In some embodiments, the listener may open a change stream on the history store to be notified of new additions, and may multiplex the listener events to all clients connected on this server. In some embodiments, all changes in an entry (per-object) may be classified as one of the following using the Pre and Post images. In some embodiments, logic 510 may be caused by an object moving into view and may include getting the object from the state store and sending to the client. In some embodiments, logic 520 may be caused by an object moving out of view and may include synthesizing an EraseObject instruction and sending to the client. In some embodiments, logic 530 may be caused by an object staying in view and may include forwarding instructions to the client. In some embodiments, logic 540 may be caused by an object staying out of view and may include skipping over instructions for the object.

Figure 21:
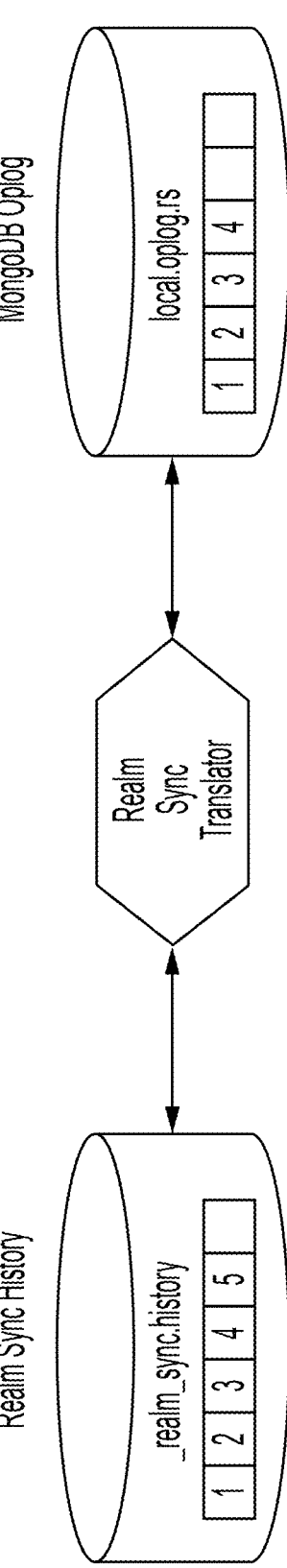
FIG. 21 is a diagram of an exemplary translator architecture, according to some embodiments.

In some embodiments, a translator may be used and in charge of the following three things: Applying changes uploaded to the server to the customer's MongoDB Atlas collections (R2M); Observing changes made to the MongoDB Atlas collections and uploading them to Realm Sync (M2R); and Coordinating these changes in a way that ultimately guarantees consistency between Realm and MongoDB. FIG. 21 shows an exemplary translator architecture, according to some embodiments. In some embodiments, there are 2 main sources of history that the translator has to deal with: Sync History (e.g., we control this collection, when it gets inserted, when it gets pruned) and MongoDB Oplog (e.g., this is how MongoDB replication works; it is implemented as a capped collection (collection with a maximum size), so the earliest entry is constantly being removed).

In some embodiments, a translator may perform the job of the sync client. For example, the translator may integrate changes from the sync server into its own history; the translator may upload its own history to the sync server when possible; changes can be made to the translator's history at any time; conflict resolution needs to take place to resolve the local history with server-side changes. In some embodiments, the translator is essentially a sync client with some caveats, including: talking directly to the sync server in-memory instead of using a websocket.

In some embodiments, a Realm Query Language (RQL) to MongoDB Query Language (MQL) Parser may be used. For IDENT and QUERY messages, the server(s) may accept pure RQL and convert it into a MongoDB query. For example, RQL: "price >10 OR location='nyc'"; MQL: {$or: [{price: {$gt: 10}}, {location: "nyc"}]}. In some embodiments, the query may then be combined with the read permissions to be the "filter" of data that is used for the bootstrap and router. For example, Read Permissions: {user_id: "abc"}; RQL: "price >10"; MQL: {$and: [{user_id: "abc"}, {price: {$gt: 10}}]}.

The inventors have recognized and appreciated that a state store can provide various benefits. For example, bootstrapping from the state store means that we can now "trim" history instead of compacting it. The inventors have recognized that previously, all history needed to be kept forever in order to bootstrap, but in some embodiments very old history need not be kept but can instead be trimmed after a period of time. In some embodiments, bootstrapping from the state store means that corrupted history will no longer cause an infinite loop of client resets. For example, a client could previously get a BAD CHANGESET for something like "Update before a CreateObject." In some embodiments, bootstrapping from the state store may prevent corrupting history and may not cause this infinite loop of issues. In some embodiments, initial syncing (enabling sync for the first time) will no longer saturate history. For example, the initial sync from MongoDB to Realm used to have to upload all changes to Realm, but now, the state store is just seeded with all of the documents and history is "empty" when sync is first enabled.

The inventors have recognized and appreciated that the basic building block of a permission is a "role." In some embodiments, "name" may be useful for debugging and logging information about which role a client is assigned. In some embodiments, "apply_when" may be used at a connection time to determine if a rule should be assigned to a given user. In some embodiments, "write" may be evaluated for each document in an upload to determine if the user has the permissions to modify that document. In some embodiments, "read" may be evaluated for each document to determine if the client should be sent the document. In some embodiments, one caveat is that write permissions imply read permissions. For example, if the write permissions expression evaluates to true, then the client implicitly has read access to the document (even if the read expression evaluates to false).

In some embodiments, assigning permissions may be as follows: if there are table-specific roles, each role may be evaluated in order using the "apply_when," which if evaluated as true means that role is used for the user for the current table and if not, go to the next role in the list and continue; if there are no table-specific roles, do the same steps as above but using the defaultRoles as the list of roles.

In some embodiments, queryable fields may be used. The inventors have recognized and appreciated that exemplary effects of having too many queryable fields include: storage will increase due to storing the Pre image and Post image in each server history entry; thus, the storage will increase more with the number of queryable fields as well as the size of the values of queryable fields (binary blobs, large strings, and lists will have more of a negative performance effect). In some embodiments, the cap on the number of queryable fields may be increased. In some embodiments, the queryable fields input may be made a map so that users can distinguish different fields for different tables. In some embodiments, queryable fields may be automatically inferred while in development mode.

In some embodiments, a translator may use a resume token. In some embodiments, the resume token is a way to mark a location in the MongoDB oplog and resume from that point. In some embodiments, the oplog has a configured size, and so the time range of data in the oplog can become very small if the cluster experiences a high amount of traffic in a short period of time. In some embodiments, if the translator falls a bit behind and the time window for the oplog is small, the resume token we use to mark our location will reference an entry that has been evicted from the oplog. When this happens, reference may be lost to where the Translator is in the oplog, which may mean there is no safe way to resume syncing because trailing changes may not be kept without having to skip over many of them.

In some embodiments, arrays may be supported as queryable fields. In some embodiments, compensating writes may be supported. In some embodiments, auto-adding queryable fields, asymmetric sync, and/or pulling in links may be supported.

Figure 22A:
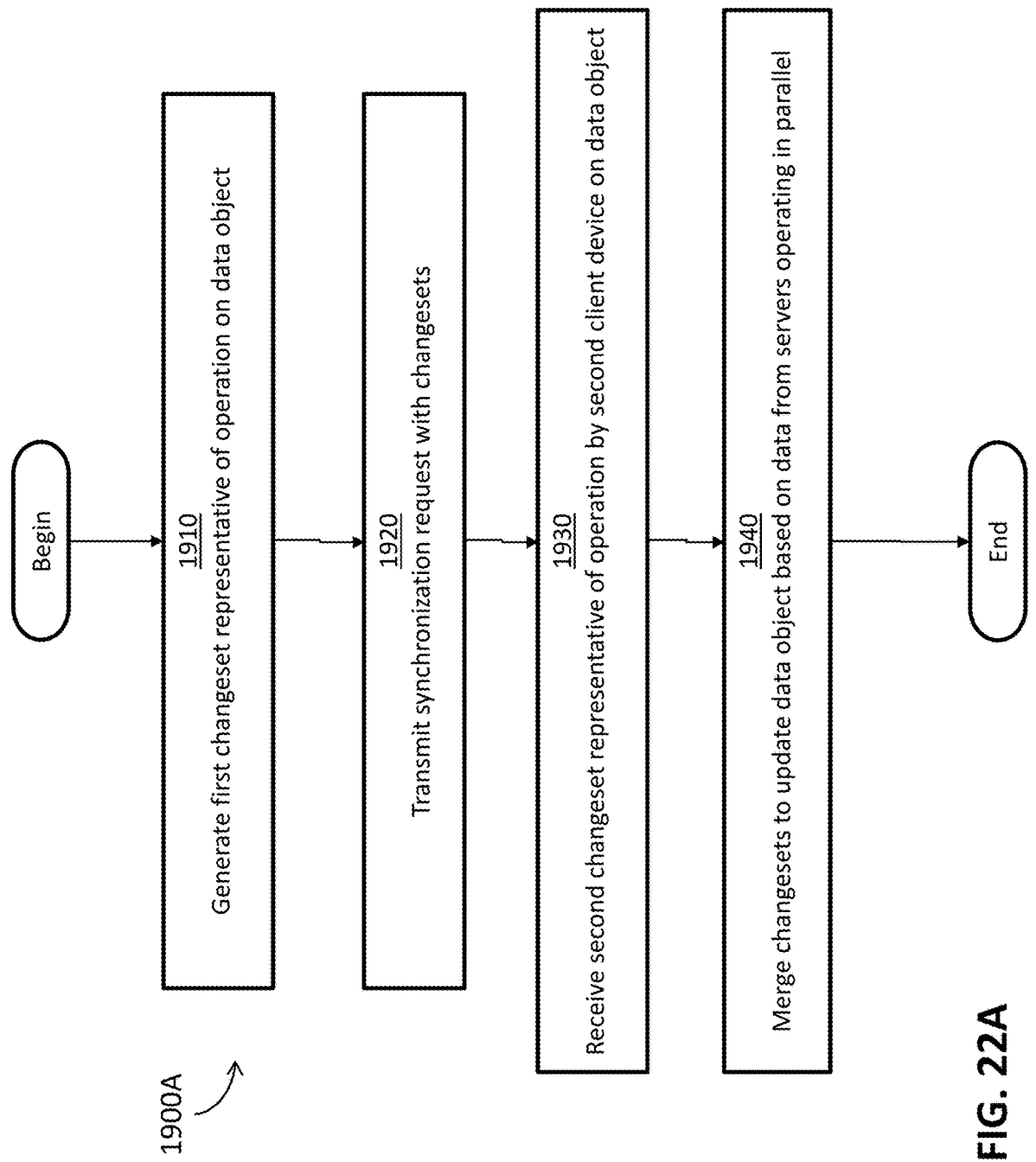
FIG. 22A is a flowchart showing an example method for managing data synchronization for a database, according to some embodiments.

As discussed above, various systems may be configured to manage data synchronization discussed herein. FIG. 22A shows an example process 1900A according to some embodiments. Process 1900A may be performed by a system (e.g., that shown in FIG. 1) to manage data synchronization for a database, such as a database employing a dynamic schema and/or an eventual consistency model. In some embodiments, process 1900A may include an act 1910 of generating (e.g., at a first client device) a first changeset representative of an operation on a data object, which may be performed by a processor.

In some embodiments, process 1900A may further include an act 1920 of transmitting a synchronization request with one or more changesets, which may be performed by a processor, which may be the same as or separate and distinct from the first processor.

In some embodiments, process 1900A may further include an act 1930 of receiving a second changeset representative of an operation by a second client device on the data object, which may be performed by a processor, which may be the same as or separate and distinct from the first processor.

In some embodiments, process 1900A may further include an act 1940 of merging changesets to update the data object based on data from servers operating in parallel, which may be performed by a processor, which may be the same as or separate and distinct from the first processor.

In some embodiments, the acts 1910, 1920, 1930, and/or 1940 may be performed by a client device and/or a server. Dividing the process 1900A between multiple devices may advantageously reduce the total amount of time required to perform the process 1900A by reducing the communication between the client device and the server.

Figure 22B:
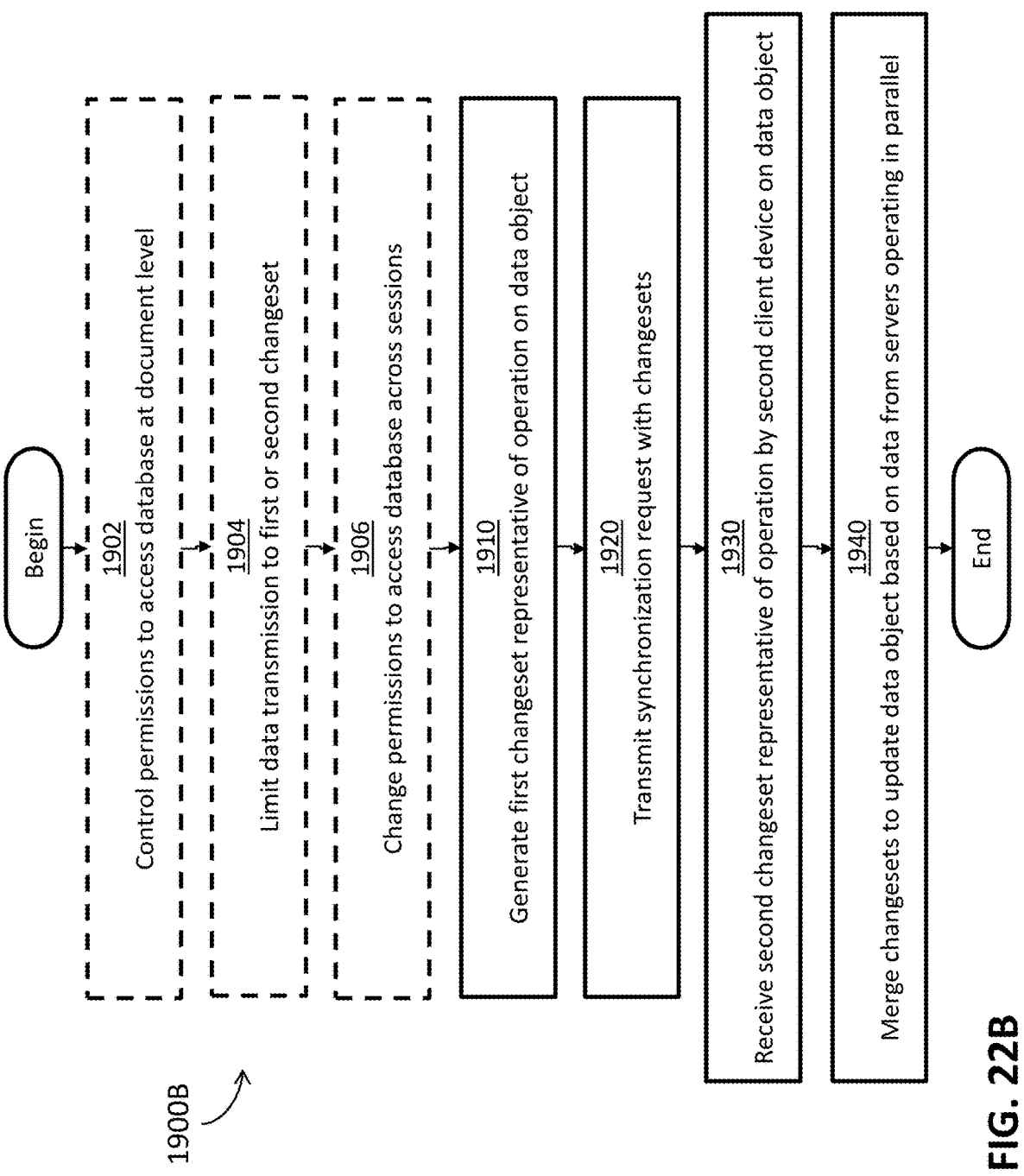
FIG. 22B is a flowchart showing an additional example method for managing data synchronization for a database, according to some embodiments.

FIG. 22B shows an example process 1900B according to some embodiments. Process 1900B may be performed by a system (e.g., that shown in FIG. 1) to manage data synchronization for a database, such as a database employing a dynamic schema and/or an eventual consistency model. In some embodiments, process 1900B may include an act 1902 of controlling permissions to access the database at the document level.

In some embodiments, process 1900B may further include an act 1904 of limiting data transmission (e.g., between a first client device, a second client device, or server(s)) to a first or second changeset.

In some embodiments, process 1900B may further include an act 1906 of changing permissions to access a database across sessions.

In some embodiments, process 1900B may further include an act 1910, similar to that described above. In some embodiments, process 1900B may further include an act 1920 similar to that described above. In some embodiments, process 1900B may further include an act 1930 similar to that described above. In some embodiments, process 1900B may further include an act 1940 similar to that described above.

Process 1900B may then end or repeat as necessary.

Additional Aspects of Tiered Synchronization

In some embodiments, a tiered synchronization system may be configured to support online upgrades and/or configuration changes, though in some cases upgrades and configurations may use a reboot and remount of the local storage volume. Some embodiments may be configured to support high-availability at the mid-tier server. Some embodiments may be configured additionally support functions, APIs, and/or other tangential app services beyond Device Sync.

In some embodiments, sync-clients may free to roam among multiple mid-tier servers and/or between a mid-tier server and a cloud-tier server, though doing may use a client reset. Some embodiments may permit for using a developer mode at the mid-tier server.

In some embodiments, database schema(s) at the mid-tier server database may be at least partially set and static and may be required to match the cloud-tier server database, although other portions and/or embodiments may not enforce a schema (e.g., using some non-relational, unstructured, and/or flexible schemas).

Some embodiments may be configured to support partition-based synchronization, and/or a varying level of sync protocols with backward compatibility. Some embodiments may provide an operations package that supports the middle tier sync-server remotely, such as permitting metrics and/or logs to be remotely collected. Some embodiments may implement a semantic versioning scheme of the mid-tier server with release notes and breaking changes. Some embodiments may support upgrades of the mid-tier server without a client reset (e.g., on the middle tier server). Some embodiments may implement a step-wise upgrade path that does not use client resets (e.g., from the mid-tier server). Some embodiments may implement a configuration transfer protocol that is set on the cloud-tier server and replicated down to the client. For example, a local configuration may be used to manually deploy the mid-tier server, such as using authentication credentials of the mid-tier server to the cloud-tier server. Some embodiments, may locally implement drivers may be able to connect to the mid-tier server and perform data write operations (e.g., insert, update) which can then be synced to the cloud-tier server database. Some embodiments may support asymmetric synchronization from remote sync-clients (e.g., 302 in FIG. 2) at the mid-tier server. Some embodiments may include an API for the sync-client (e.g., 304) to understand what mid-tier server the sync client is configured to be connecting to and what metadata the sync-client may use in order for their app to function properly.

In some embodiments, a mid-tier server may be configured to support PBS. In some embodiments, a mid-tier server may be configured to handle changing permissions and schema. In some embodiments, a mid-tier server may be configured to also support app services other than sync. In some embodiments, a mid-tier server may be configured to be automatically upgraded with new release versions. In some embodiments, a mid-tier server may be configured to support asymmetric synchronization. In some embodiments, a mid-tier server may be configured to support changing the query while running. In some embodiments, a mid-tier server may be configured to translate and apply changes made directly to the database application (e.g., MongoDB) to which the mid-tier server is connected. In some embodiments, a mid-tier server may be configured to forward flexible sync queries from sync-clients to the cloud-tier server to dynamically expand the data stored on the client and mid-tier server database. In some embodiments, a mid-tier server may include an operations package that supports the mid-tier sync-server remotely enabling remote troubleshooting and force upgrades of the mid-tier server on a policy-defined schedule. In some embodiments, multiple mid-tier servers implemented in communication using a single app may be rolled out across many branch locations, in which case an API for the sync-client may be provided to understand which mid-tier server is open for connection, which mid-tier server the sync-client should be connecting to and what metadata the sync-client should use in order for their app to function properly, such as query parameters.

Computer System

Figure 23:
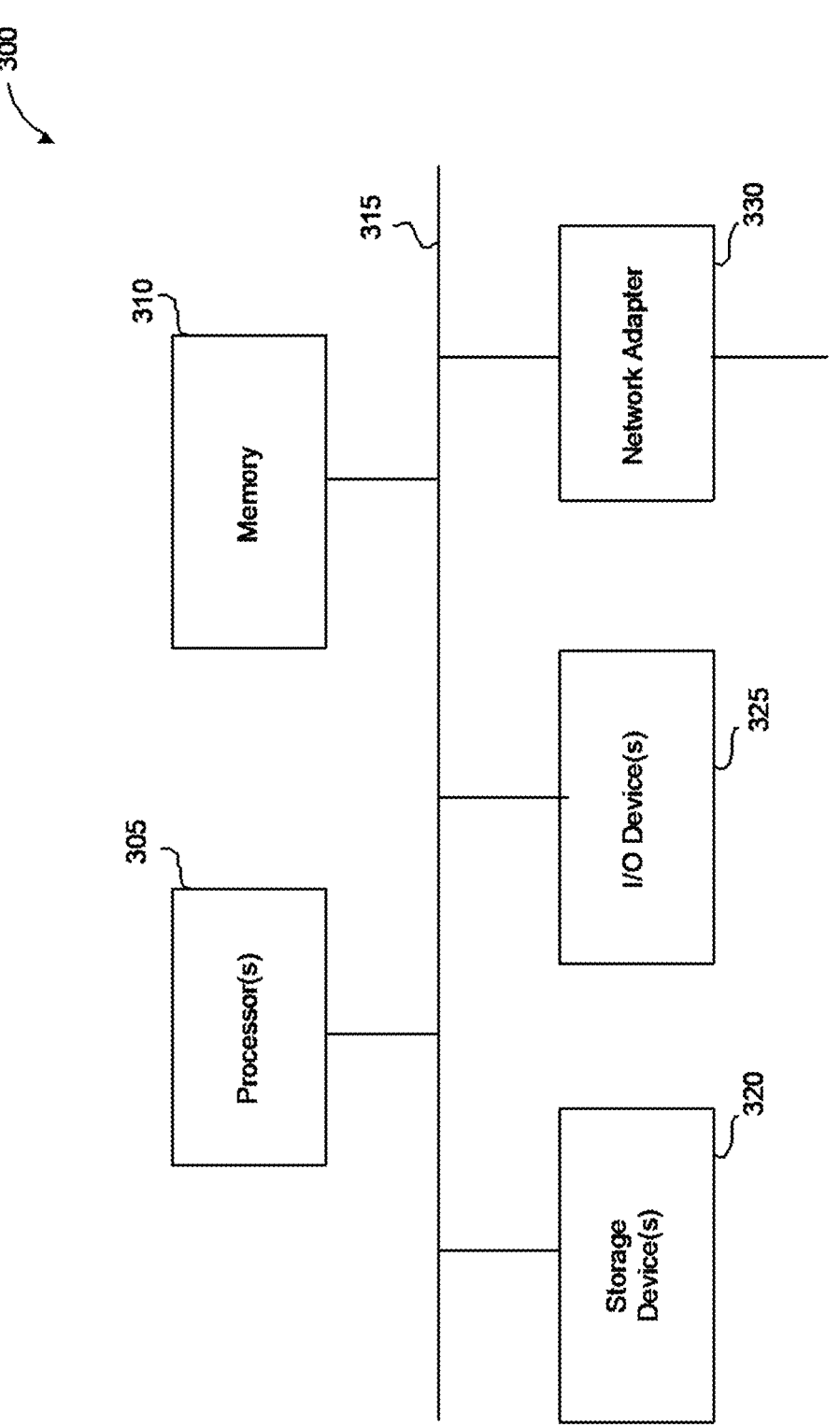
FIG. 23 is an example block diagram of a machine in the example form of a computer system within which a set of instructions for causing the machine to perform one or more of the methodologies discussed herein may be executed, according to some embodiments.

FIG. 23 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g., keyboard and pointing devices, touch devices, display devices, storage devices 320, e.g., disk drives, and network adapters 330, e.g., network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g., via network adapter 330.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A tiered database synchronization system, comprising:
a mid-tier server database;
a cloud-tier server database in communication with the mid-tier server database over a remote network connection; and
a mid-tier server operatively coupled to the mid-tier server database and configured to:
independent of the remote network connection, synchronize the mid-tier server database based on non-relational data interactions between client systems and the mid-tier server over a local network connection;
when the mid-tier server is connected to the cloud-tier server database over the remote network connection, synchronize the mid-tier server database with the cloud-tier server database based on the non-relational data interactions;
receive, from a first client system over the local network connection, a first changeset that is representative of a non-relational operation on a data object in the mid-tier server database performed by the first client system;
receive, from a second client system over the local network connection, a second changeset that is representative of a non-relational operation on the data object performed by the second client system; and
in response to receiving, from the first client system over the local network connection, a synchronization request for synchronizing the first client system at least with the second client system, transmit, to the first client system, the second changeset,
wherein the first client system is configured to merge the first changeset and the second changeset to update the data object.

2. The tiered database synchronization system of claim 1, wherein the mid-tier server is configured to periodically check the remote network connection and, in response to detecting that the mid-tier server is connected to the cloud-tier server database over the remote network connection, synchronize the mid-tier server database with the cloud-tier server database.

3. The tiered database synchronization system of claim 1, wherein the mid-tier server is configured to, independent of the remote network connection, act as a server to client systems connected to the mid-tier server over the local network connection.

4. The tiered database synchronization system of claim 1, further comprising a cloud- tier server operatively coupled to the cloud-tier server database, wherein the mid-tier server is further configured to act as a client to the cloud-tier server when the mid-tier server is connected to the cloud- tier server over the remote network connection.

5. The tiered database synchronization system of claim 1, wherein the remote network connection comprises the Internet, and wherein the local network connection comprises a local area network connection.

6. The tiered database synchronization system of claim 1, wherein the mid-tier server database and the cloud-tier server database are remote with respect to one another, and wherein the mid-tier server is configured to communicate over the local network connection with client systems that are local to the mid-tier server.

7. The tiered database synchronization system of claim 1, wherein the mid-tier server is located in a location at which the mid-tier server has intermittent access to the cloud-tier server database over the remote network connection.

8. The tiered database synchronization system of claim 1, wherein the mid-tier server is configured to, independent of the remote network connection, respond to requests for access to data stored in the mid-tier server database, the requests received from client systems over the local network connection.

9. The tiered database synchronization system of claim 1, wherein the mid-tier server is further configured to, when connected to the cloud-tier server database over the remote network connection, request access to data stored in the cloud-tier server database in response to requests for access to data not stored in the mid-tier server database, the requests received from client systems over the local network connection.

10. The tiered database synchronization system of claim 1, wherein the mid-tier server is further configured to:

when the mid-tier server is connected to the cloud-tier server database over the remote network connection, receive, from the cloud-tier server database over the remote network connection, a third changeset that is representative of an operation on a version of the data object in the cloud-tier server database performed by a client system that is not connected to the mid-tier server over the local network connection; and in response to receiving the synchronization request from the first client system over the local network connection, further transmit, to the first client system over the local network connection, the third changeset, wherein the first client system is further configured to merge the first changeset and the second changeset with the third changeset.

11. A tiered database synchronization method, comprising:

synchronizing, by a mid-tier server, a mid-tier server database based on non-relational data interactions between client systems and the mid-tier server over a local network connection;

when the mid-tier server is connected to a cloud-tier server database over a remote network connection, synchronizing the mid-tier server database with the cloud-tier server database based on the non-relational data interactions;

receiving, from a first client system over the local network connection, a first changeset that is representative of a non-relational operation on a data object in the mid-tier server database performed by the first client system;

receiving, from a second client system over the local network connection, a second changeset that is representative of a non-relational operation on the data object performed by the second client system; and in response to receiving, from the first client system over the local network connection, a synchronization request for synchronizing the first client system at least with the second client system, transmitting, to the first client system, the second changeset, wherein the first client system merges the first changeset and the second changeset to update the data object, and wherein synchronizing the mid-tier server database based on the non-relational data interactions between client systems and the mid-tier server is independent of the remote network connection.

12. The tiered database synchronization method of claim 11, further comprising, by the mid-tier server, periodically checking the remote network connection and, wherein synchronizing the mid-tier server database with the cloud-tier server database is in response to detecting that the mid-tier server is connected to the cloud-tier server database over the remote network connection.

13. The tiered database synchronization method of claim 11, further comprising, by the mid-tier server, independent of the remote network connection, acting as a server to client systems connected to the mid-tier server over the local network connection.

14. The tiered database synchronization method of claim 11, further comprising, by the mid-tier server, acting as a client to a cloud-tier server coupled to the cloud-tier server database when the mid-tier server is connected to the cloud-tier server over the remote network connection.

15. The tiered database synchronization method of claim 11, wherein the remote network connection comprises the Internet, and wherein the local network connection comprises a local area network connection.

16. The tiered database synchronization method of claim 11, wherein the mid-tier server database and the cloud-tier server database are remote with respect to one another, and wherein the mid-tier server communicates over the local network connection with client systems that are local to the mid-tier server.

17. The tiered database synchronization method of claim 11, wherein the mid-tier server is located in a location at which the mid-tier server has intermittent access to the cloud-tier server database over the remote network connection.

18. The tiered database synchronization method of claim 11, further comprising, by the mid-tier server, independent of the remote network connection, responding to requests for access to data stored in the mid-tier server database, the requests received from client systems over the local network connection.

19. The tiered database synchronization method of claim 11, further comprising, by the mid-tier server, when connected to the cloud-tier server database over the remote network connection, requesting access to data stored in the cloud-tier server database in response to requests for access to data not stored in the mid-tier server database, the requests received from client systems over the local network connection.

20. The tiered database synchronization method of claim 11, further comprising, by the mid-tier server:

when the mid-tier server is connected to the cloud-tier server database over the remote network connection, receiving, from the cloud-tier server database over the remote network connection, a third changeset that is representative of an operation on a version of the data object in the cloud-tier server database performed by a client system that is not connected to the mid-tier server over the local network connection; and in response to receiving the synchronization request from the first client system over the local network connection, further transmitting, to the first client system over the local network connection, the third changeset, wherein the first client system further merges the first changeset and the second changeset with the third changeset.

21. The tiered database synchronization system of claim 1, wherein the mid-tier server database comprises a non-relational portion.

22. The tiered database synchronization method of claim 11, wherein the mid-tier server database comprises a non-relational portion.

* * * * *